United States Patent
Bablumyan et al.

(10) Patent No.: US 11,698,492 B2
(45) Date of Patent: *Jul. 11, 2023

(54) WAVEGUIDE IMAGE COMBINERS FOR AUGMENTED REALITY DISPLAYS

(71) Applicant: A9.com, Inc., Palo Alto, CA (US)

(72) Inventors: Arkady Bablumyan, Tucson, AZ (US); Lloyd J LaComb, Jr., Tucson, AZ (US)

(73) Assignee: A9.com, Inc., Palo Alto, CA (US)

( * ) Notice: Subject to any disclaimer, the term of this patent is extended or adjusted under 35 U.S.C. 154(b) by 350 days.

This patent is subject to a terminal disclaimer.

(21) Appl. No.: 16/832,611

(22) Filed: Mar. 27, 2020

(65) Prior Publication Data
US 2020/0225416 A1    Jul. 16, 2020

Related U.S. Application Data

(63) Continuation-in-part of application No. 16/041,347, filed on Jul. 20, 2018, now Pat. No. 10,859,833.
(Continued)

(51) Int. Cl.
*G02B 6/28* (2006.01)
*G02B 27/10* (2006.01)
(Continued)

(52) U.S. Cl.
CPC .......... *G02B 6/28* (2013.01); *G02B 27/1006* (2013.01); *G02B 27/0081* (2013.01); *G02B 27/0172* (2013.01); *G02B 2027/0178* (2013.01)

(58) Field of Classification Search
CPC .......... G02B 27/0172; G02B 27/1086; G02B 27/0081; G02B 27/44; G02B 2027/0178;
(Continued)

(56) References Cited

U.S. PATENT DOCUMENTS 6,906,836 B2  6/2005 Parker et al.
8,233,204 B1  7/2012 Robbins et al.
(Continued)

FOREIGN PATENT DOCUMENTS

WO  WO2016020643 A1  2/2016
WO     2017102795 A1  6/2017
(Continued)

OTHER PUBLICATIONS

Shen, Zhongwen, "Characterization and Optimization of Field of View in a Holographic Waveguide Display," IIEEE Photonics Journal, vol. 9, No. 6, Dec. 2017.
(Continued)

*Primary Examiner* — Kimberly N. Kakalec
(74) *Attorney, Agent, or Firm* — Kilpatrick Townsend & Stockton LLP

(57) ABSTRACT

A waveguide image combiner is used to transmit a monochrome or full-color image in an augmented reality display. The combiner uses multiple stacked substrates and multiple pairs of incoupling and outcoupling VHOEs to expand a first FOV and an image expander to expand the second or perpendicular FOV. This suitably provides an expanded FOV that offers a diagonal FOV≥50°, a horizontal FOV≥40 and a vertical FOV≥25°. The combiner also delivers a large horizontal eye box up to 20 mm and a vertical eye box of 10 mm while maintaining high light efficiency of the real scene (e.g. >80%). The system is able to use a light engine based on broadband (10 nm≤Δλ≤40 nm) LEDs and maintain a large horizontal field of view and high transmission of the real imagery. The approach resolves issues with current embodiments including astigmatism, image overlap, color balance, and small light engine pupils leading to reduced eye boxes.

20 Claims, 14 Drawing Sheets

Note all three colors for a given angular range in each hologram

Related U.S. Application Data

(60) Provisional application No. 62/547,411, filed on Aug. 18, 2017.

(51) Int. Cl.
*G02B 27/01* (2006.01)
*G02B 27/00* (2006.01)

(58) Field of Classification Search
CPC .... G02B 2027/0174; G02B 2027/0105; G02B 2027/0196; G02B 2027/013
See application file for complete search history.

(56) References Cited

U.S. PATENT DOCUMENTS

| | | | |
|---|---|---|---|
| 9,513,480 B2 | 12/2016 | Saarikko et al. | |
| 2006/0126179 A1 | 6/2006 | Levola | |
| 2006/0132914 A1* | 6/2006 | Weiss | G02B 30/40 359/462 |
| 2006/0228073 A1 | 10/2006 | Mukawa et al. | |
| 2006/0291021 A1 | 12/2006 | Mukawa | |
| 2009/0245730 A1 | 10/2009 | Kleemann | |
| 2009/0303212 A1* | 12/2009 | Akutsu | G02B 27/0172 345/204 |
| 2011/0096401 A1* | 4/2011 | Levola | G02B 6/0016 359/573 |
| 2012/0033306 A1 | 2/2012 | Valera et al. | |
| 2013/0051730 A1 | 2/2013 | Travers et al. | |
| 2015/0016777 A1 | 1/2015 | Abovitz et al. | |
| 2015/0277117 A1* | 10/2015 | Yamada | G02B 27/0172 385/37 |
| 2015/0293358 A1 | 10/2015 | de Matos Pereira Vieira et al. | |
| 2016/0041387 A1 | 2/2016 | Valera et al. | |
| 2016/0116739 A1 | 4/2016 | TeKolste et al. | |
| 2016/0124229 A1 | 5/2016 | Yokoyama | |
| 2016/0131912 A1* | 5/2016 | Border | G02B 5/28 345/8 |
| 2016/0320536 A1 | 11/2016 | Simmonds et al. | |
| 2017/0052377 A1 | 2/2017 | Amitai | |
| 2017/0276948 A1 | 9/2017 | Welch et al. | |
| 2018/0275350 A1* | 9/2018 | Oh | G02B 27/0172 |
| 2018/0284460 A1 | 10/2018 | Cheng et al. | |
| 2018/0299678 A1 | 10/2018 | Singer et al. | |
| 2019/0285897 A1 | 9/2019 | Topliss et al. | |

FOREIGN PATENT DOCUMENTS

| | | | |
|---|---|---|---|
| WO | WO2017180403 A1 | 10/2017 |
| WO | 2018031634 A1 | 2/2018 |
| WO | WO2018209108 A2 | 11/2018 |

OTHER PUBLICATIONS

Piao, Jing-Ai, "Full Color Holographic Optical Element Fabrication for Waveguide-type Head Mounted Display Using Photopolymer," Journal of the Optical Society of Korea, vol. 17, No. 3, Jun. 2013, pp. 242-248.

Guo, Jingjing, "Design of a multiplexing grating for color holographic waveguide," SPIE, Optical Engineering 54(12) 125105, Dec. 2015.

Barden et al., "Volume-Phase Holographic Gratings and the Efficiency of Three Simple vol. Phase Holographic Gratings," Publications of the Astronomical Society of the Pacific, 112:809-820,Jun. 2000.

Zhou et al., "See-through near-eye displays enabling vision correction," Optical Society of America, Jan. 25, 2017.

Bigler et al., "Holographic Waveguide HUD with in-line pupil expansion and 2D FOV expansion" Optical Society of America, 2019.

Close, D.H., Holographic Optical Elements, Optical Engineering, vol. 14, No. 5, Sep.-Oct. 9, 1975.

Augmented Reality Module (AR Module), Product Brief, WaveOptics, 2018.

Hunsperger, R.G., "Optical Waveguide Modes," Integrated Optics, DOI 10.1 007/b98730 2, Springer Science+Business Media, LLC 2009.

Wang et al., "Optical Design of Waveguide Holographic Binocular Display for Machine Vision," Applied Mechanics and Materials ISSN: 1662-7482, vols. 427-429, pp. 763-769, Sep. 27, 2013.

Guo et al., "Holographic waveguide display with a combined-grating in-coupler," Optical Society of America, Nov. 9, 2016.

U.S. Appl. No. 16/917,368, "Non-Final Office Action," dated Apr. 26, 2022, 19 pages.

Levola, "Diffractive Optics for Virtual Reality Displays," Journal of the Society for Information Display, vol. 14, No. 5, May 2006, pp. 467-475.

U.S. Appl. No. 17/018,981, "Non Final Office Action," dated Sep. 1, 2022, 14 pages.

U.S. Appl. No. 16/917,368, "Non-Final Office Action," dated Oct. 13, 2022, 19 pages.

U.S. Appl. No. 16/917,368, "Notice of Allowance," dated Jan. 30, 2023, 9 pages.

U.S. Appl. No. 17/018,981, "Final Office Action," dated Mar. 10, 2023, 21 pages.

* cited by examiner

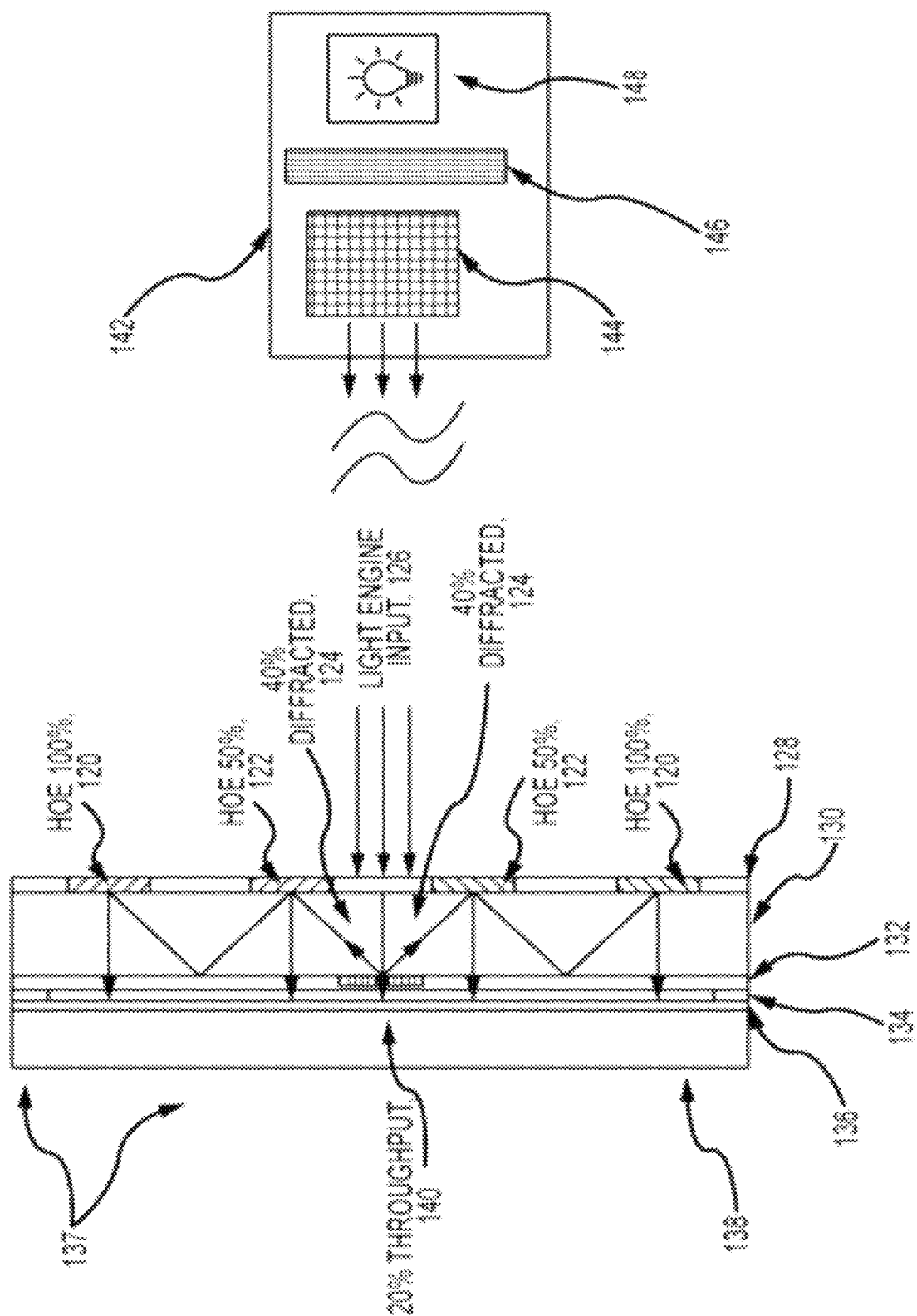

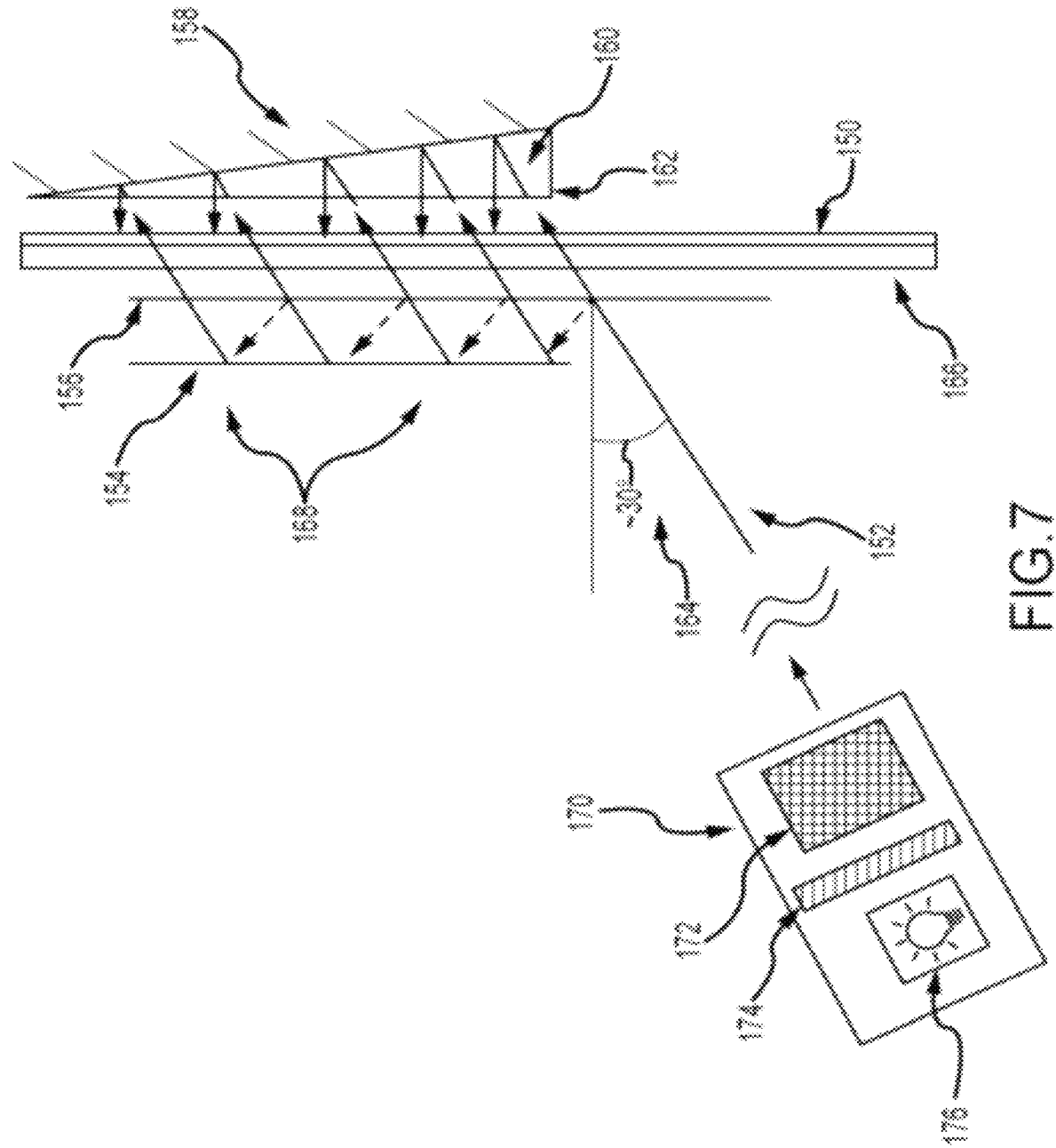

Note all three colors for a given angular range in each hologram

WAVEGUIDE IMAGE COMBINERS FOR AUGMENTED REALITY DISPLAYS

CROSS-REFERENCES TO RELATED APPLICATIONS

This application is a continuation-in-part, and claims benefit of U.S. patent application Ser. No. 16/041,347, filed Jul. 20, 2018, which is a non-provisional of U.S. Provisional Application No. 62/547,411, filed Aug. 18, 2017, the specifications of which are incorporated herein in their entirety by reference.

BACKGROUND OF THE INVENTION

Field of the Invention

This invention relates to waveguide image combiners for combining real imagery and auxiliary content to generate an augmented reality display.

Background Art

Combining computer-generated imagery with real imagery exists in a continuous range described as the reality-virtuality continuum. At one end of the continuum exists "reality", the image reaching the viewer's eye has no computer generated information. At the other end is "virtual reality" where all the information reaching the viewer's eye is displayed by a computer. Within the continuum is mixed or augmented reality where light from a light engine is combined with the real imagery and both reach the viewers eye. This "auxiliary content" projected by the light engine may include one or more of computer generated imagery, a live or recorded video feed, text or other analog or digital information. In augmented reality applications, the auxiliary scene and the view of the outside world need to be combined and integrated into the observer's field of view (FOV). There are numerous techniques of beam combining that can change the auxiliary content propagation direction in such a way that one can see the auxiliary content and the outside world at the same time.

Augmented display systems are comprised of several subsystems including an image engine that generates the auxiliary content, a light input subsystem that couples the auxiliary content into the viewing device, and a light output subsystem that couples light from the device and transmits the real scene to the viewer's eye. These subsystems are combined into glasses, helmets, or heads up display devices. The glasses-based systems are often called near-to-eye (NTE) displays or NED. If the system combines auxiliary content with a view of the outside world, an image combiner may be used to allow the viewer to see both the auxiliary and real content simultaneously. To provide the viewer with the most realistic experience possible, the image combiner and display system should provide a horizontal and vertical FOV that is as large as possible while maximizing the size of the "eye box"—output pupil size at the position of the eye. Many current embodiments have diagonal FOVs that are less than 40 degrees and eye boxes of less than 10 mm×10 mm, which negatively impacts the user's experience.

As shown in FIG. 1, one of the most elegant ways to build a waveguide image combiner is the use of waveguide (WG) holography. This technique uses an input Holographic Optical Element (HOE) 14 to trap through total internal reflection (TIR) auxiliary content 32 generated by an image engine 10 inside a transparent substrate 12 where auxiliary content 32 propagates away from the image engine and is outcoupled toward the viewer's eye 24 by an output HOE 20. Both the input and output HOEs are transparent across the entire visible range except for an approximately 20% reduction in transmission across the bandwidth of the broadband RGB light sources. This allows the viewer to see the real imagery 18 and the auxiliary content 32. The light engine and output HOEs emit within a cone of light 28.

The waveguide image combiner has an eye box 26 in the horizontal and vertical directions. The eye box is the vertical and horizontal distance where the viewer's pupil receives all the angles emitted by the light engine. A large eye box is desirable for accommodating eye movement, physical variation among viewers, and mechanical tolerances. As the viewer's pupil moves outside the eye box, the image becomes degraded. Eye relief 22 is the distance between the substrate surface and the entrance pupil of the viewer's eye. For maximum comfort, this distance should be ≥20 mm.

The field-of-view (FOV) 30 is the angular size of the image determined by the geometric relationship between the size of the outcoupling HOE and the distance between the pupil and the surface of the outcoupling HOE. Holographic optical element is a general term that describes a functional diffractive structure that transforms the waveform of the input beam into an output beam. A volume holographic element (VHOE) is a type of HOE that operates in the Bragg diffraction regime. A waveguide image combiner represents the optical system that includes all the optical elements in the optical path from the exit aperture of the light engine to the plane where light enters the eye.

Image combiners using HOEs can operate in either a transmission mode where the light is diffracted as is passes through the HOE or in a reflection mode where the light is diffracted and returns in the opposite direction after striking the HOE. Existing NTE systems based on either reflection or transmission HOEs have demonstrated diagonal FOVs of 40 degrees or less. As shown in the calculations to follow (1), the theoretical maximum angular range that can be coupled into substrate modes using a single recording layer transmission HOE corresponds to a horizontal FOV of 30° (for n=1.5). For simplicity, FOV angles are measured in air and acceptance angles for reflection VHOE are measured inside the substrate. The relationship between the air and substrate angles is described by Snell's law. For the calculations below, the refractive index (n) is assumed to be n=1.5 representing an "typical" glass material (n for glasses ranges from 1.4 to 2.0 see Abbe diagram for examples).

HOEs operating in reflection mode are always volume holograms (VHOEs). A reflection VHOE is capable of in-coupling into substrate modes (light propagating through Total Internal Reflection (TIR)) corresponding to horizontal FOV of up to 70°. However, a reflection VHOE recorded in a single layer has an acceptance angle of less than 5° because of the high angular selectivity of volumetric holograms (low diffraction efficiency outside 5 degrees). While expanding the FOV for narrowband laser-based systems using HOEs with optical power is possible, the resulting small eye-box size (~5 mm), laser speckle, and eye safety concerns, make this approach impractical. The invention shows ways to expand the acceptance angle or FOV for broadband image sources.

A successful image combiner system will need to meet the following objectives
1) High transmission of the light from the real scene of at least 80%.

2) Large auxiliary field of view. Diagonal FOV>50 degrees, Horizontal FOV>40 degrees, and Vertical FOV>25 degrees.
3) Large eye box, at least 20 mm in the horizontal direction and 10 mm in the vertical direction.
4) Ability to accept auxiliary content from broadband (10 nm≤Δλ≤40 nm) LED RGB inputs.

To build a holographic waveguide image combiner capable of meeting the objectives, several issues must be addressed.

1. Holograms are highly dispersive elements (i.e., the diffraction angle varies as a function of wavelength per eqn. 1) and their use for imaging with broadband sources leads to chromatic aberrations.
2. Off-axis image propagation introduces astigmatism that distorts the image.
3. The image bouncing between the transparent substrate surfaces as it propagates between the input and output HOEs, can cause overlapping of the different image regions causing a scrambled output image.
4. The color balance of the light engine must be maintained by the waveguide holographic combiner.
5. To reduce the size and weight of NTE systems, the light engine in NTE systems have small apertures that must expanded to achieve large FOVs.

The first issue can be resolved if the angle of each input ray is equal to that of the output ray. This can be achieved if the image inside the transparent substrate (WG) is located at the infinite conjugate plane (Fourier-image) where each direction of the rays corresponds to a particular point of the image. This approach also eliminates the lateral and axial chromatic aberration with broadband sources. This requires that both input and output HOEs be planar gratings without optical power in order to leave the conjugate plane of the image intact. The planar grating (hologram formed using two collimated beams) used for the input and output HOEs also resolves issue 2 since the astigmatism introduced by the off-axis input, will be compensated with the same off-axis output angle. Infinite-conjugate projection will resolve issue 3 because the beams shift after each bounce but do not shift the image located at infinity.

Light engines are designed to achieve a certain white balance (the ratio between the primary emission wavelengths that provide a natural looking image-white balance is typically expressed in degrees Kelvin of a black body source producing the same spectral distribution). The WG image combiner must maintain the white balance of the light engine along the optical path to the viewer's eye. The specular properties of an HOE can change by factors of 2 or more over wavelength changes of a few nanometers. Issue 4 can be addressed for broadband LED sources in the waveguide image combiner by balancing the change in wavelength with a corresponding change in angle to provide constant transmission efficiency across the emission spectrum of the three LEDs.

The FOV limitations are different in the direction of image propagation in the substrate (horizontal) and perpendicular to it (vertical) and can be improved using different techniques described below.

To accommodate consumer demand for a large FOV, innovative techniques are needed to improve the user's overall experience. While either transmission or reflection HOE could be implemented in the display, only reflection HOEs can provide a large horizontal FOV. Transmission HOEs can be used in the waveguide image combiner when the angular requirements on the FOVs are smaller.

The relationship between the input angles and the output angles of an HOE can be analyzed using the well-known diffraction formula:

$$dn(\sin\theta_{in} + \sin\theta_{out}) = \lambda \quad (1)$$

$$(\sin\theta_{in} + \sin\theta_{out}) = \frac{\lambda}{dn} = const$$

The diffraction geometry of the WG HOEs assumes that the axis of the cone of input angles $\theta_{in}$ should be close to normal and that the diffracted beams should be in the range between the substrate critical angle ($\theta_c=\sin^{-1}(1/n)$) and the sliding angle ($\theta_{out}=90°$):

$$\sin^{-1}\left(\frac{1}{n}\right) < \theta_{out} < 90° \quad (2)$$

in order to propagate along the axis of the transparent substrate.

As defined in FIG. 2a and Equation (2), for a transmission input HOE 50 on a substrate 56, the variation of $\sin(\theta_{out})$ for a diffracted beam 54 for a substrate with n=1.5 is about 0.34, and straightforward calculations show that the range of input angles 60 for the input beam is limited to ~20° ($\theta_{max}$ 58-$\theta_{min}$ 52) inside the transparent substrate and ~30° outside of it. This limits maximum horizontal FOV for transmission HOEs. To achieve a wider FOV, reflection VHOEs should be used. The NTE application must employ phase holographic elements since amplitude holographic elements would reduce the light available.

As defined in FIG. 2b, for a reflection input VHOE 62 on a substrate 56, the range of input angles 70 at a central angle $\theta_{in}$, 68 for the input beam and range of output diffracted angles 64 at central angle $\theta_{in}$ 66 are symmetrical relative to the normal 72 of the planes of HOE's diffraction pattern and consequently have the same range of angular variation. Thus, according to (2) diffracted beams will be in-coupled into substrate modes if the input beam angles stay within a ~47° angular range inside the substrate (for n=1.5 substrate) and ~70° in the air. This theoretical value for the range of input angles that can be in-coupled into substrate modes for reflection HOE's, is limited by a high angular selectivity of reflection VHOEs, which have significant diffraction efficiency only for the angles close the Bragg angle. One way to increase the acceptance angle of reflection VHOE is the use of holographic materials with exceptionally high Δn≥0.1). This decreases the penetration depth of the input beam and, correspondingly, decreases the angular selectivity of the hologram. However, recording materials with exceptionally high Δn reported in the literature, are not well suited for WG applications because of their high absorption and scattering affects.

Both horizontal and vertical FOV are limited by the distance from the aperture stop of the image engine to the center of the output HOE. In a typical design, this is measured from the temple arm of the glasses to the center of the lens of the transparent substrates (eye straight view), shown in FIG. 1. For a typical human head, this distance is about ~35-40 mm. In order for NTE glasses to accommodate size, weight, and power restrictions, the size of the image engine should be as small as possible. In some designs, this makes the size of the aperture stop (pupil) as small as 5 mm in diameter in relation to the desired Vertical FOV of 25°. In this case, the limitation on vertical FOV can become significant and would need to be expanded. Pupil expansion in the horizontal direction is naturally provided by the waveguide geometry of the combiner. This is because the image experiences multiple bounces in the direction of the output HOEs and each bounce of the image shifts the images angular view. Consequently, multiple bounces result in the expansion of the horizontal FOV. Below we describe several ways to expand the pupil in vertical direction, prior art demonstrates several ways of doing this. Companies in this field have demonstrated combiners that use surface relief gratings for incoupling, vertical expansion, and outcoupling purposes. One of the shortcomings of surface relief gratings (SRG) is their overall light efficiency in NTE applications. These surface structures introduce multiple orders where >50% of the light can be lost for each HOE. Because SRG are transmission gratings, they are also limited to only 25-30° FOV for a single layer. They also don't allow for RGB to be incoupled using one layer because of color separation and need at least two layers separated by an air gap to produce a full-color image. Subsequently, this causes a color variation where one side of the image will appear redder, and the other bluer. These surface relief gratings provide a transmission efficiency of <50%, an expanded vertical FOV of at most 15' and require multiple films for multiple colors.

BRIEF SUMMARY OF THE INVENTION

It is an objective of the present invention to provide systems, devices, and methods, that allow for large FOV waveguide image combiners, as specified in the independent claims. Embodiments of the invention are given in the dependent claims. Embodiments of the present invention can be freely combined with each other if they are not mutually exclusive.

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention is a waveguide image combiner used to transmit a monochrome or full-color image in an augmented reality display. The combiner suitably provides an expanded horizontal and vertical FOV that offers a diagonal FOV≥50°, a horizontal FOV≥40 and a vertical FOV≥0.25°. The combiner also delivers a large horizontal eye box up to 20 mm and a vertical eye box of 10 mm while maintaining high light efficiency of the real scene (e.g. >80%). The system is able to use a light engine based on broadband (10 nm≤Δλ≤40 nm) LEDs and maintain a large horizontal field of view and high transmission of the real imagery. The approach resolves issues with current embodiments including astigmatism, image overlap, color balance, and small light engine pupils leading to reduced eye boxes.

The waveguide image combiner of the present inventions overcomes the issues and limitations on both H and V FOV expansion associated with surface relief gratings. To expand the H FOV, the present invention uses reflection VHOEs. Since VHOEs only have one diffraction order (as opposed to multiple orders in surface relief gratings), a more efficient use of the light is achieved. In addition, VHOEs are able to outcouple all of the light contained in the image. The high outcoupling efficiency is achieved by fabricating a VHOE that has a gradient diffraction efficiency across the propagation path, and allows for an even distribution of the light to the viewer's eye.

A Y expander is used to expand the vertical FOV and improve the overall light transmission through the system. This is accomplished by replicating the light engines small aperture multiple times in the vertical direction. A uniform intensity of the copies is achieved by adjusting the intensity of each copy to an identical value. The duplication can be accomplished with reflecting elements such as mirrors or prisms or diffractive elements such as HOEs or SRGs. The Y expander provides transmission efficiencies of >80%, an expanded FOV of at least 25° and is compatible with the single-film incoupling and outcoupling VHOE design.

In an embodiment, a waveguide image combiner combines light from real imagery with light representing auxiliary content from a light engine to present augmented reality to a viewer. The waveguide imager combiner includes a first optically transparent substrate having top and bottom surfaces and at least first and second pairs of incoupling and outcoupling reflective VHOEs spaced apart horizontally and overlaid on the top surface of the optically transparent substrate. The incoupling VHOEs are configured to diffract light from the light engine in first and second non-overlapping but contiguous angular ranges horizontally into the substrate where the light travels through total internal reflection (TIR) to the outcoupling VHOEs which diffract the light to the viewer with a horizontal FOV equal to the extent of the first and second angular ranges. The reflective VHOEs transmit light from the real imagery across the entire visible spectrum with an approximately 20% reduction at the wavelengths of light from the light engine so that light from real imagery is combined with the light from the light engine to create an integrated image.

In different embodiments, the VHOEs may include a single grating configured to reflect light at a center wavelength with a bandwidth between 10 nm and 40 nm or R, G and B gratings in a single optical film configure to reflect light at R, G and B wavelengths each with a bandwidth of at least 10 nm.

In an embodiment, the outcoupling VHOEs are configured with a gradient in their diffraction efficiency in the horizontal to provide uniform light intensity in the horizontal FOV.

In an embodiment, a Y-expander is configured to duplicate a pupil of the light engine vertically N time where N is an integer of at least two such that each duplicate image has an intensity of 1/N said at least first and second pairs of incoupling reflective VHOEs extending vertically on the top surface of the substrate to capture the N copies of the pupil which expands to fill the vertical extent of the outcoupling VHOE and presents a vertical FOV equal to N times the FOV possible with a single pupil. The Y expander provides transmission efficiencies of >80%, an expanded FOV of at least 25° and is compatible with the single-film incoupling and outcoupling VHOE design. In different embodiments, the duplication may be accomplished with reflecting elements such as mirrors or prisms or diffractive elements such as HOEs.

In an embodiment, a full color image combiner combines auxiliary content from a light engine having a bandwidth of 10 nm to 40 nm. The image combiner exhibits a horizontal FOV of at least 28 degrees (preferably at least 40 degrees) and a vertical FOV of at least 20 degrees (preferably at least 25 degrees) producing a diagonal FOV of at least 35 degrees and preferably at least 50 degrees. They eye box is at least 20 mm×10 mm and the image combiner satisfies the four objects and five issues previously discussed for a successful image combiner system.

One of the unique and inventive technical features of the present invention is the stacking of multiple waveguide substrates to form an image combiner. Without wishing to limit the invention to any theory or mechanism, it is believed that the technical feature of the present invention advantageously provides for large FOV as multiple substrates may allow for expansion of the FOV. Another of the unique and inventive technical features of the present invention is the multiplexing of various angular and spectroscopic ranges of light across multiple substrates such that adjacent spectroscopic ranges of light in each substrate have differing angular ranges. Without wishing to limit the invention to any theory or mechanism, it is believed that the technical feature of the present invention advantageously provides for a large field of view with good color uniformity as well as a reduction of phantom or "ghost" image artifacts. None of the presently known prior references or work has the unique inventive technical feature of the present invention.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWINGS

The features and advantages of the present invention will become apparent from a consideration of the following detailed description presented in connection with the accompanying drawings in which:

FIG. 6 is a diagram of an embodiment of a Y-expander in which a transmission HOE is added to the substrate on the side of the image engine and exhibits a variable diffraction efficiency to allow uniform intensity to exit the input VHOE.

FIG. 7 is a diagram of another embodiment of the Y-expander in which a prism is added to the image engine side of the substrate and a gradient mirror and a fully reflecting mirror are added behind the reflection HOE to produce a uniform intensity for the light exiting the input HOE.

DETAILED DESCRIPTION OF THE INVENTION

Figure 1:
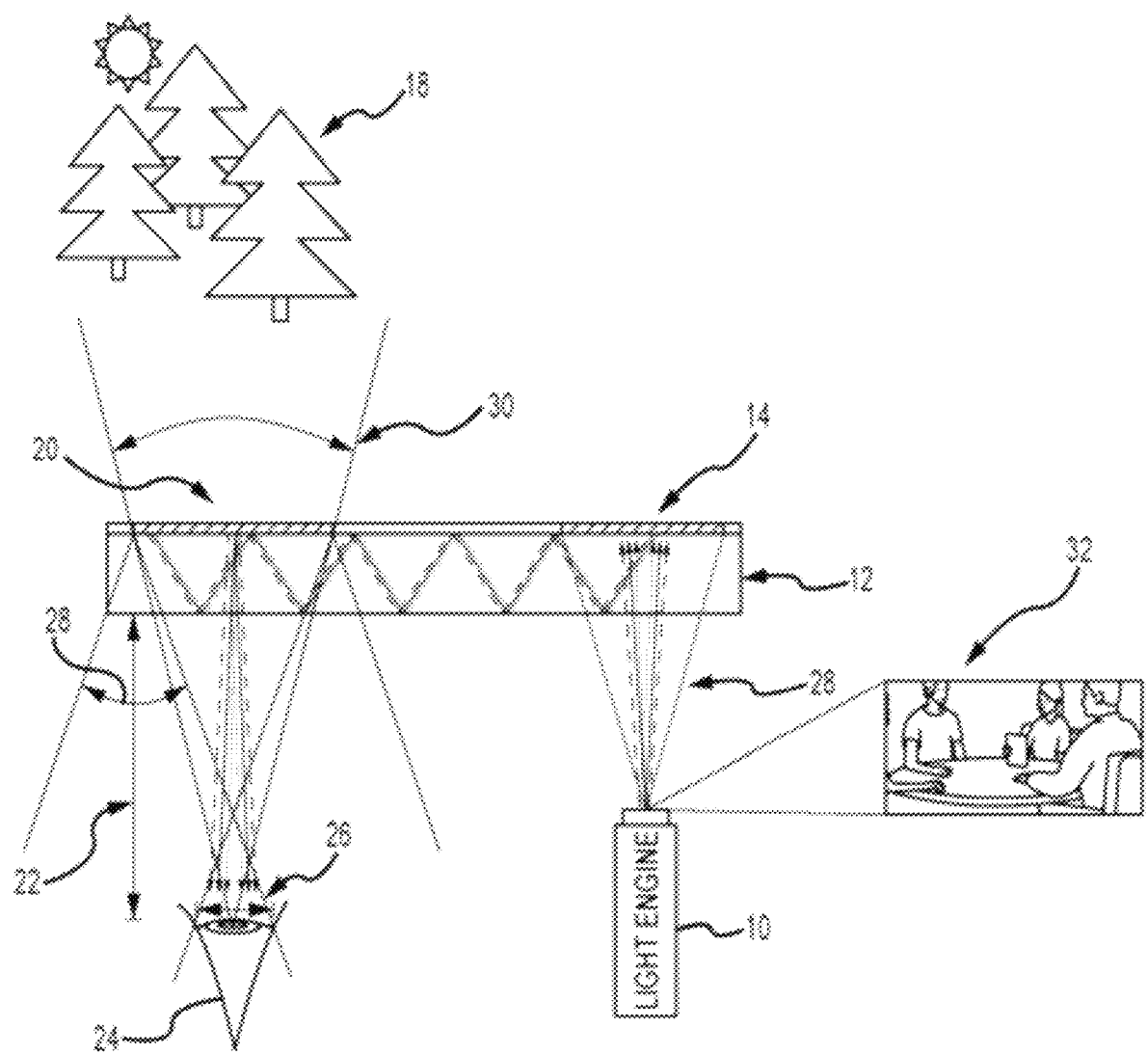
FIG. 1, as described above, is a drawing of an image combiner using waveguide holography.
Figure 2B:
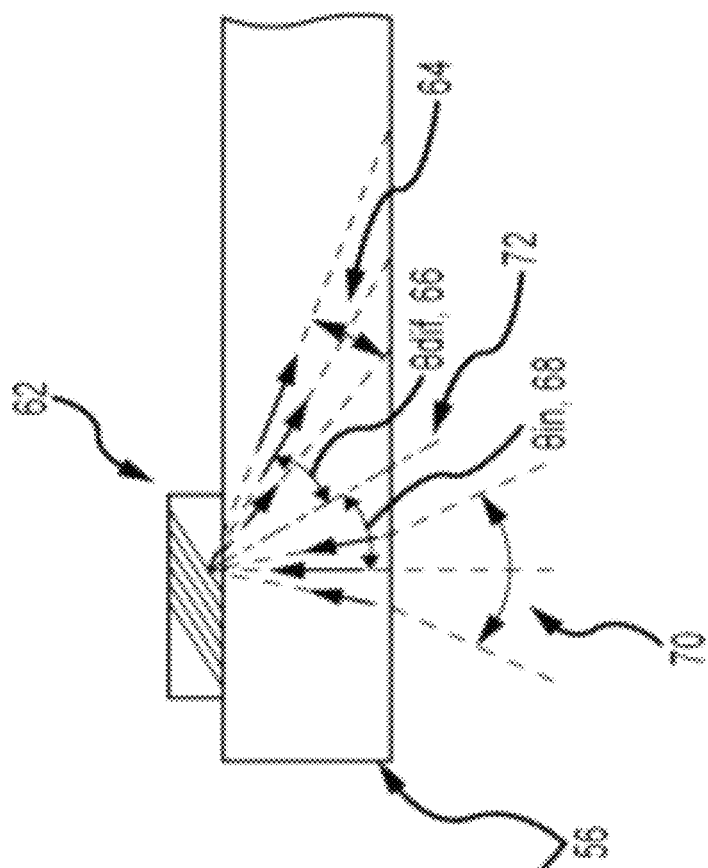
FIGS. 2a and 2b, as described above, are diagrams of transmissive and reflection holograms, respectively, showing the range of angles that can propagate in the substrate.
Figure 2A:
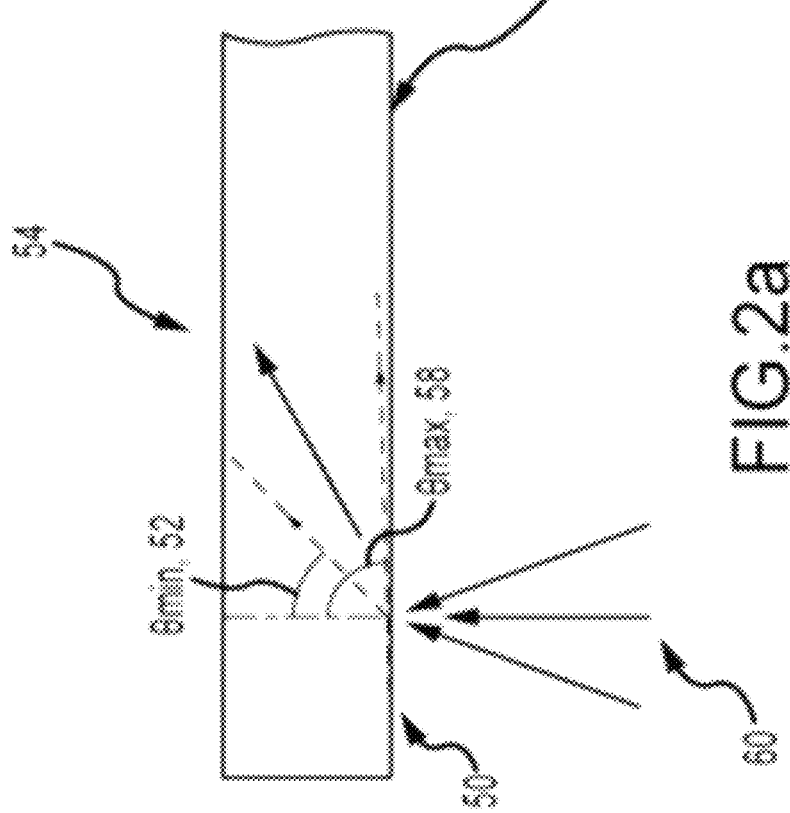

The present invention describes a waveguide image combiner used to transmit a monochrome or full-color image in an augmented reality display. The combiner suitably provides an expanded horizontal and vertical FOV that offers a diagonal FOV≥50°, a horizontal FOV≥40 and a vertical FOV≥25°. The combiner also delivers a large horizontal eye box up to 20 mm and a vertical eye box of 10 mm while maintaining high light efficiency of the real scene (e.g. >80%). The system is able to use a light engine based on broadband (10 nm≤Δλ≤40 nm) LEDs and maintain a large horizontal field of view and high transmission of the real imagery. This approach resolves issues with current embodiments including astigmatism, image overlap, color balance, image artifacts, and small light engine pupils leading to reduced eye boxes.

Expanded Horizontal FOV

As stated above, although reflection VHOEs allow image incoupling into single substrate modes up to 70° FOV, a large angular range can't be achieved with a single reflection VHOE due to its small input acceptance angle (approximately 4-5 degrees) for a narrowband laser source. Narrowband sources introduce safety and image quality concerns and reduce the eye box size. Most light engines employ broadband LED sources to overcome these issues. The light from the broadband source in the light engine is emitted at a range of angles that reaches the VHOE.

The input VHOE is designed to collect as large a range of angles as possible (large FOV) and to maintain the white balance of the output image by capturing the one or more illumination colors and the bandwidth of each color from the light engine. Reflection VHOEs can maintain high diffraction efficiency for a large angular range as long as the combination of wavelength and incidence angle satisfy the Bragg condition (3). A LED bandwidth of +/−15 nm will be diffracted from the VHOE at different angles covering an angular range of approximately 10° according to (3) while maintaining white balance in the image as we explain it bellow. The tradeoff is bandwidth of each color vs angular range. The more bandwidth for each color, the less angular range that is available to avoid overlapping.

To provide the best user experience, the system must transmit as much of the auxiliary content (full color, broad bandwidth, and large vertical and horizontal FOVs) as possible through the substrate using total internal reflection. The maximum angular range for transmission gratings is approximately 20° inside the substrate and 30° outside. Existing embodiments using transmission VHOE suffer from reduced FOV and monochrome operation due to the limited angular range available in the substrate. Surface relief grating experience similar issues due to the multiple diffraction orders creating cross talk between the various angles. Reflection VHOEs enable a larger angular range inside the substrate (up to 74°), which enables with proper design of the VHOEs, full color, high brightness, and large diagonal FOV to be achieved.

Figure 3:
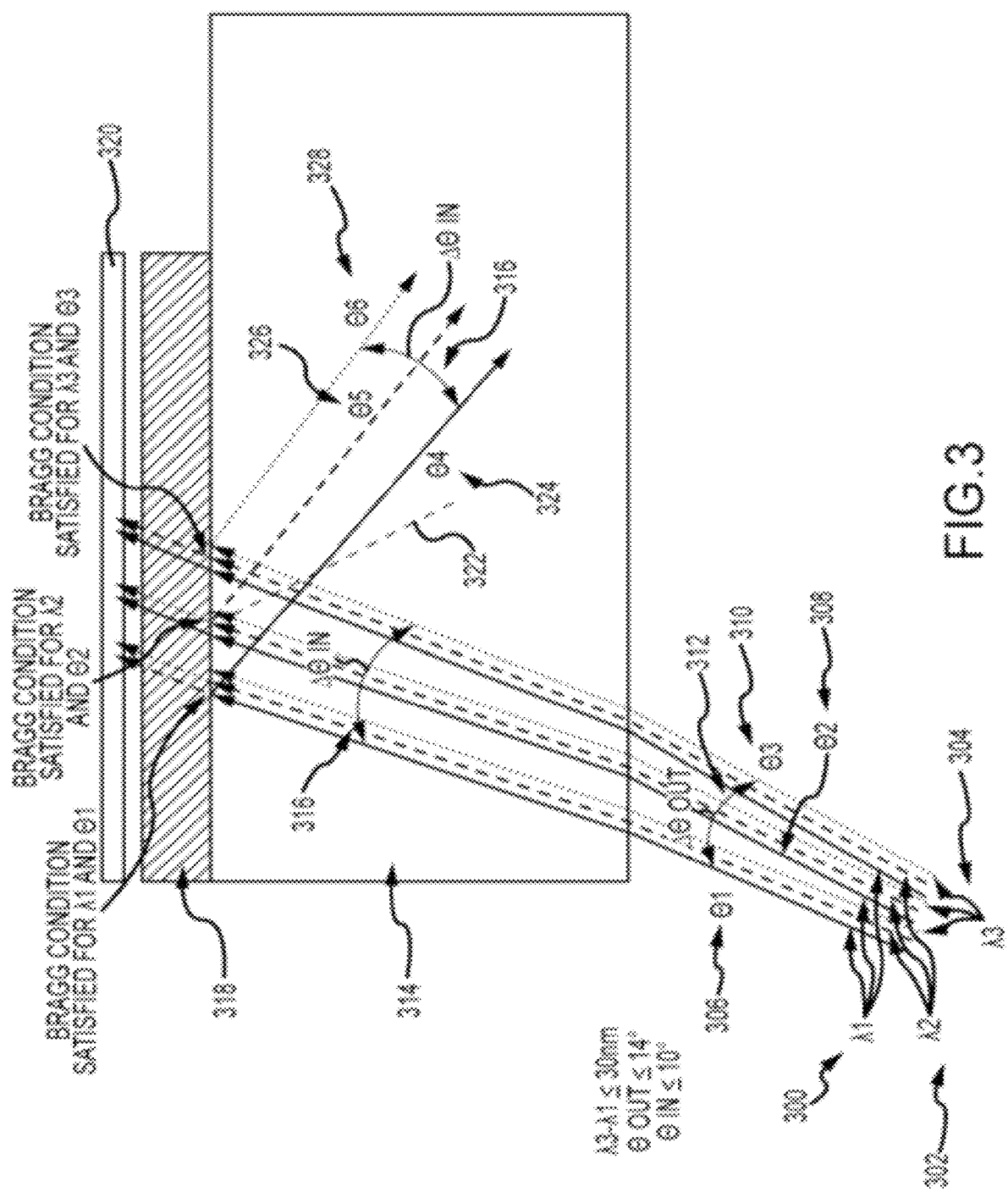
FIG. 3 is a diagram illustrating the expansion of the angular acceptance with broadband sources.

As shown in FIG. 3, a VHOE 318 is able to diffract and trap within the substrate 314 light from the light engine at a large acceptance angle 316 $\Delta\theta_{IN}$ composed of angles in the range from |θ4 324-θ5 326-θ6 328| corresponding to 14° FOV $\Delta\theta_{OUT}$ 312 composed of angles in the range from θ1 306 to θ2 308 to θ3 310 and broadband light from the LED sources |λ1 300-λ3 304|≤30 nm. At each point in the input VHOE 318 a combination of wavelength and angle satisfy (3) and that light is diffracted into the substrate mode, the remaining light is transmitted and absorbed by the absorber 320 or otherwise removed from the system. The light emitted from the broadband source at λ1 300 is diffracted at θ4 324, the light at λ2 302 is diffracted at θ2 326, the light at λ3 304 is diffracted at θ3 328 relative to the normal 322 of the grating vector of the VHOE. This configuration captures the wavelength range of the broadband source emitted over a 14° FOV within the substrate with each wavelength traveling at a slightly different angle. At the output VHOE the process is reversed, and the broadband image is created with the 14° FOV. A full color image can be created by three broadband RGB beams whose relative intensities are properly adjusted to provide a white balance. The white balance is maintained because each layer contains three simultaneously printed VHOEs—one for each of the primary colors. Each VHOE is able to couple the broadband output of the LED into the substrate modes, $$2dn \sin(\theta) = \lambda \qquad (3)$$

where (θ) is the incident angles, λ is the wavelength and d is the grating spacing.

In accordance with one aspect of the invention, the high angular selectivity of reflection VHOEs allows multiple VHOEs (each on a separate film layer) to be physically overlaid on the single substrate and mechanically aligned to increase the total acceptance angle of the combiner. Each VHOE accepts the input from only one non-overlapping range of angles. The VHOEs independently redirect the input angular region into the substrate with different angles to eliminate cross-talk between the input angular ranges. A monochrome VHOE includes a single grating in the film layer. A color VHOE may include three gratings tuned to R, G and B wavelengths in the single film layer or three layers corresponding to the three colors. In an embodiment, a two layer pair of VHOEs can expand the horizontal FOV up to approximately 28 degrees and a three layer pair of VHOEs can expand the horizontal FOV up to approximately 42 degrees. For a 42 degree horizontal FOV, the system will have a diagonal FOV of approximately 50 degrees. In other embodiments, more VHOEs may be configured to expand the horizontal FOV to approximately 60 degrees for a single substrate.

Figure 4:
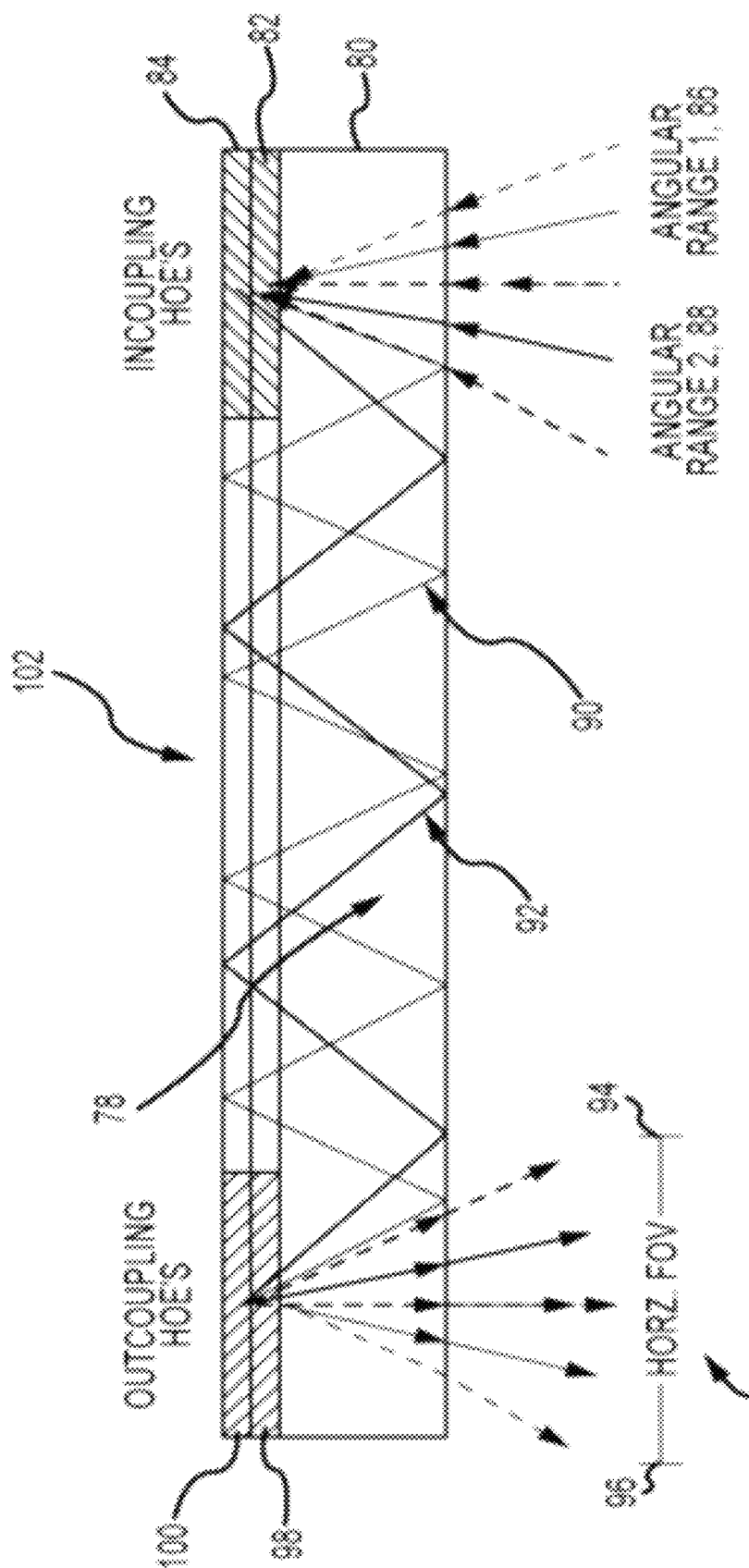
FIG. 4 is a diagram of an embodiment of an image combiner that physically overlaps two reflection input VHOE gratings tuned to different input angular ranges to expand the horizontal FOV.

As shown in FIG. 4, in an embodiment an image combiner 78 can be constructed from a multiplicity of matched input and output VHOEs to expand the horizontal FOV. In this embodiment two (or more) overlapping VHOE incoupling/outcoupling pairs, 82/98 and 84/100 are attached to substrate 80. Input VHOE 1 82 diffracts the three primary colors emitted by the light engine but only at a cone of angles within input angular range 1 86 and directs them into the substrate along path 90. The angles not in angular range 1 86 are transmitted through VHOE1 to VHOE2 84. The cone of angles in angular range 2 88 are transmitted through VHOE1 82 and are diffracted by VHOE2 84 into the substrate 80 along path 92. To avoid a gap in the outcoupled image, the angular ranges are preferably contiguous but non-overlapping. When substrate modes 90 and 92 reach the outcoupling VHOEs, the diffraction process is reversed. The rays from angular range 1 86 that travel along light path 90 are diffracted by outcoupling VHOE1 98 into angular range 1 96. Similarly, light in angular range 2 88 that travels along substrate mode 92 passes through VHOE1 98 since it is not at the correct angle and is diffracted by VHOE2 100 into output angular range 2 94. Each reflection output VHOE independently out-couples adjacent image cones into a doubled horizontal FOV 104. The number of input/output VHOEs can be increased beyond two if the angular ranges of diffracted beams from each VHOE pair can be separated from each other inside the substrate to eliminate cross-talk between them. As stated above, this is possible for up to a 70° in a single substrate (in practice 60° to eliminate using sharp angles close to 90°) horizontal FOV. The manufacturing and assembly process can be simplified, and the imaging performance improved by using one large piece having input/output VHOE pair and an unexposed region 102 between them.

For an input image produced using multiple broadband sources, for example three LEDs with 30 nm bandwidth centered in the red, green, and blue portions of the visible spectrum, the bandwidth of each component will be diffracted into a cone of angles inside the substrate. Each incoupling and outcoupling VHOE may include three simultaneously printed diffraction gratings in a single film, one grating for each of the R, G and B colors, or may include separate films for each diffraction grating. The three gratings may be simultaneously printed using three narrow lasers, or printed sequentially. In FIG. 4, rays 90 and 92 become a collection of rays that encodes angular and spectral information about the input signal. When the collection of rays diffracts from its complementary output VHOE the spectral and angular information contained in the input signal is restored. Proper selection of the output propagation angle of the HOE allows multiple HOE to accept different input angular ranges and redirect them along different propagation angles in the substrate without any cross talk. Additional VHOEs can be added to further increase the horizontal FOV to its maximum value.

Figure 5A:
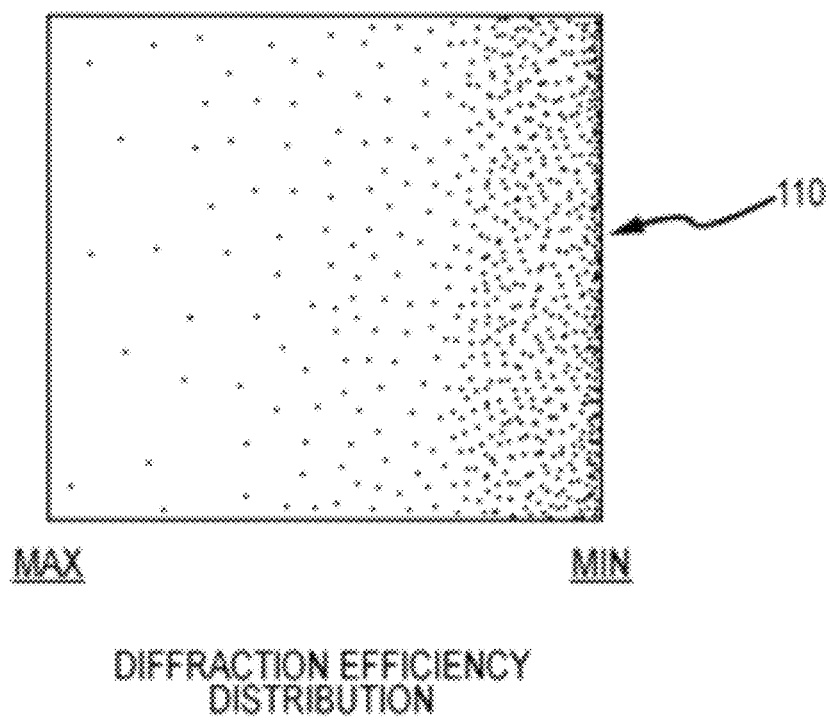
FIGS. 5a and 5b are diagrams showing the distribution of the diffraction efficiency for the output HOE in which the diffraction efficiency varies linearly along the propagation (horizontal) axis and is constant along the vertical axis to produce a uniform intensity of the auxiliary content as it exits the output VHOE.
Figure 5B:
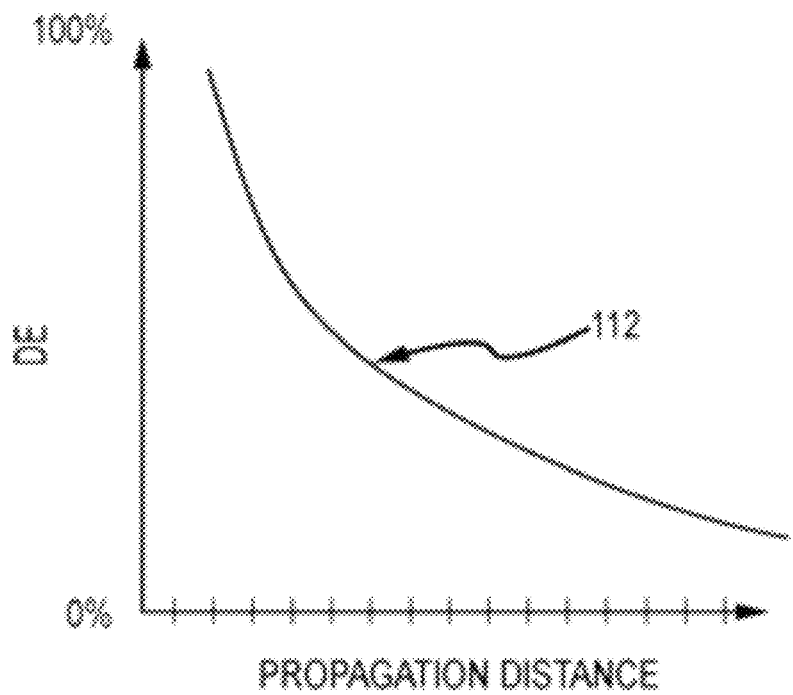

To achieve a uniform brightness or intensity, the diffraction efficiency of the output HOEs must be varied along the image propagation direction. Such a variation can be achieved by varying the contrast of the interferometric pattern during VHOE recording. It can be done using a gradient mask 242 in the path of one of the recording beams as it is shown on FIG. 9b. FIG. 5a shows the DE of an outcoupling HOE 110 or the right eye waveguide combiner. In either the right eye or left eye combiner the DE is lowest (min) on the input VHOE side of the output VHOE and highest of the side farthest away from the input VHOE. As shown in FIG. 5b, the transition between the minimum and maximum DE is structured to provide constant output intensity 112. The DE is constant in the vertical direction.

Expanded Vertical FOV

Various pupil-expanding elements (called Y expanders) have been designed to meet the requirements (see above) for both vertical FOV and eyebox in the vertical direction. Each of these embodiments is compatible with the monochrome and full color horizontal FOV expansion techniques and substrate propagation described above.

The goal of the Y expander is to duplicate, with uniform intensity, the pupil (aperture) of the light engine to maximize the vertical eye box. All embodiments replicate the pupil N (where N is an integer) times with each copy of the image having an intensity of 1/N. The pupil image can be divided using diffraction or reflection.

Figure 8:
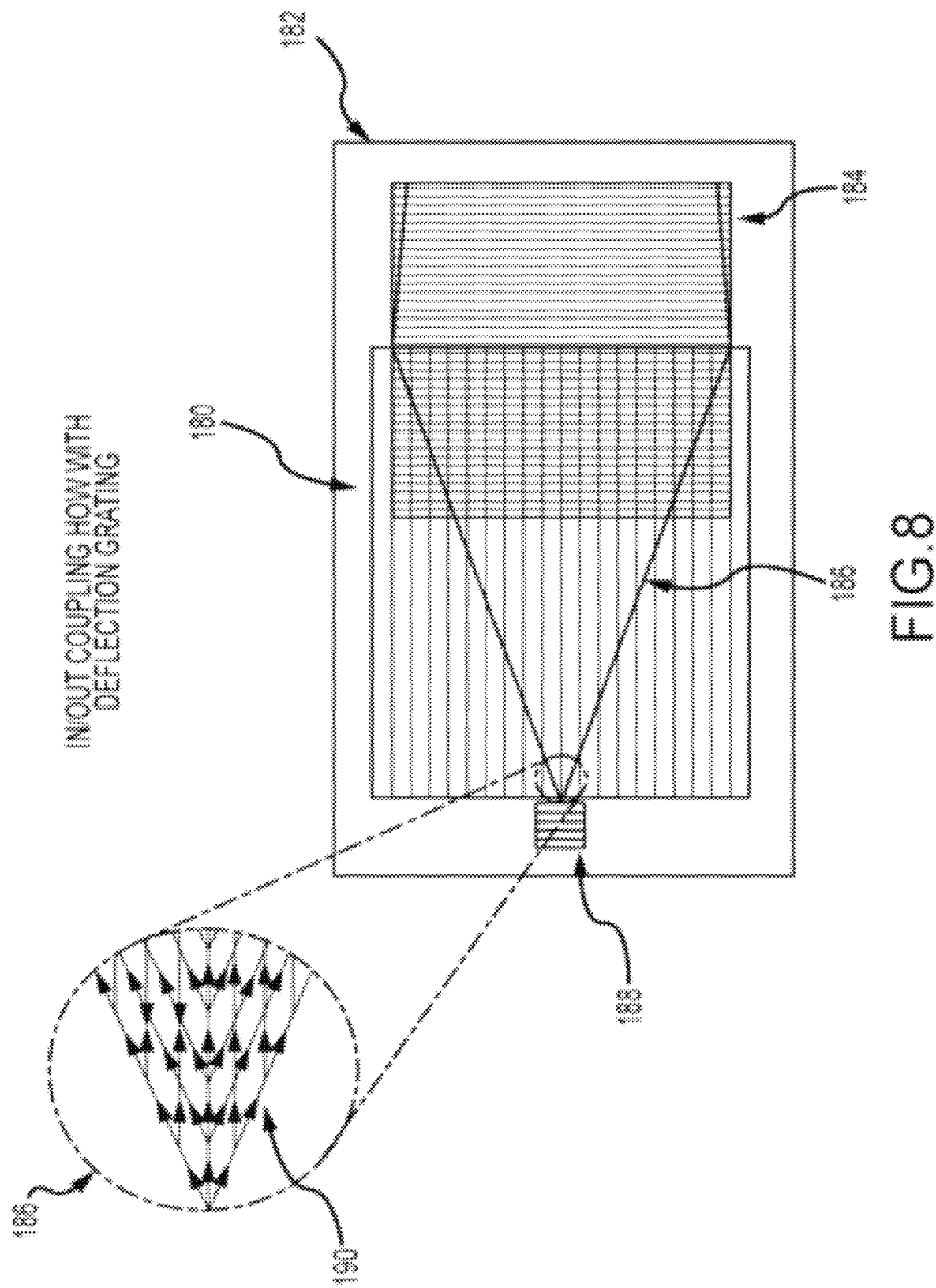
FIG. 8 is a diagram of another embodiment of the Y-expander in which a single film working for all angular ranges is used to distribute the light uniformly over the y-direction of the output HOE.

FIGS. 6 and 7 represent designs where the light engine pupil 126, 152 is duplicated in the vertical direction. The design in FIG. 6 is based on HOEs, and FIG. 7 is based on mirrors. FIG. 8 is based on an additional HOE 180 that is recorded on another layer on the substrate 182.

As shown in FIG. 6, an embodiment of a Y expander waveguide 137 is an additional structure attached to the transparent waveguide substrate 138 and input VHOE 136. The expander is comprised of a transparent thick substrate (at least 3-4 mm) 130 with two films 128 and 132 containing HOE on either side of the substrate. The Y expander is separated from the waveguide substrate by spacers 134 to ensure an air gap. In this embodiment, the light engine input 126 is incident upon a Y-expander with 5 output images. The diffraction efficiencies of the 5 HOEs are designed so the 5 output images have the same intensity. The input HOE 140 will diffract 124 40% in both directions with 20% being transmitted. The output HOEs 122 closest to the image engine input should reflect 50% of the light and the last HOEs 120 will have close to 100% diffraction efficiency to reflect the remaining light. The HOEs in the design should have a sufficient acceptance angle to reflect full angular cone of the image in vertical direction (15-25°). This requires a holographic material with a suitable $\Delta n$ value (min. 0.05) and can become a limiting factor for achieving a large vertical FOV. To minimize or eliminate gaps between multiple Inputs, a one-dimensional diffuser 146 in the Y-direction can be added to the light engine 142 between the light source 148 and the display 144.

The design of a Y expander 168 shown in FIG. 7 removes the $\Delta n$ requirement described above by using a mirror-based system. In this embodiment, the light engine input 152 enters the waveguide substrate 166 through the incoupling VHOE 150 at an angle from the normal 164 of approximately 30 degrees. Angle 164 is also the angle of the right triangle in the prism mirror assembly 158. A resonator comprised of a 100% reflection mirror 164 and a gradient mirror 166 reflects the light multiple times along its path and duplicate the image engines pupil multiple times. These images propagate parallel to each other at a slanted angle 164 in the YZ plane of the WG. The 100% mirror positioned on the opposite side the prism assembly 168 straightens this slanted angle to provide normal input of the images into the incoupling VHOE 150. The prism assembly can be either a solid prism of the appropriate index or an assembly 162 created from multiple pieces of glass and filled with an index liquid 160. To eliminate gaps between multiple inputs, a one-dimensional diffuser 174 in the Y-direction is added to the light engine 170 between the light source 176 and the display 172.

Another embodiment of a Y expander 180 covers the area between incoupling and outcoupling VHOEs plus part or the whole area over the output VHOE with a low DE (5% to 15%) and low spatial frequency transmission grating producing diffraction angles between 25° and 45° recorded on an additional film layer as shown on FIG. 8. In this embodiment, one layer of holographic film is applied to the substrate 182 and contains an input VHOE 188, and Y expander 180 and an output VHOE 184 and works for all angular ranges. Some part or all of the output VHOE 182 will overlap with the Y expander 180. The image from the light engine is in-coupled into the waveguide through the input VHOE bounces between substrate surfaces at TIR (direction perpendicular to the page in FIG. 8) and at each bounce it passes through the Y expander 180, reflects off the surface through TIR and passes back through the grating. Each crossing of the grating splits the beam into 0-th and 1-st diffraction orders, so that beam reflected from the substrate surface with the grating splits into four beams: two propagating into direction of 0-th diffraction order and two—into direction of ±1st diffraction order 190 and these pair are separated at distance d obtained from the following equation $$d = 4*t*\tan\alpha*\tan\frac{\theta}{2} \quad (4)$$

where t is the WG thickness, a is the TIR propagation angle, $\theta$ is the diffraction angle of the grating.

Multiple bounces result in both spreading out vertically the beams propagating in the direction of 0-th order (input beam direction) and homogenization of their brightness. Thus, the grating diffraction angle $\theta$ defines the rate of pupil expansion 186 in vertical direction along the propagation path of the beam and it is not difficult to see that grating with length L will increase the pupils size $P_v$ to $$P_v = L*\tan\theta \quad (5)$$

Full Color Image Combiner with Expanded H and V FOV

In an embodiment, a full color image combiner includes at least first and second pairs of incoupling and outcoupling VHOEs spaced apart and overlapped on an optically transparent waveguide. Each VHOE includes at least R, G and B gratings in a single optical film, or in three stacked layers, with each grating having a bandwidth of at least 10 nm. The first and second pairs of incoupling and outcoupling VHOEs accept light within angular regions that are contiguous but non-overlapping to increase the effective angular region of the image computer and expand the horizontal FOV. A Y-expander duplicates, with uniform intensity, the pupil of the light engine to maximize the vertical eye box. The image combiner exhibits a horizontal FOV of at least 28 degrees (preferably at least 40 degrees) and a vertical FOV of at least 20 degrees (preferably at least 25 degrees) producing a diagonal FOV of at least 35 degrees and preferably at least 50 degrees. They eye box is at least 20 mm×10 mm and the image combiner satisfies the four objects and five issues previously discussed for a successful image combiner system.

Printing Process.

Figure 9A:
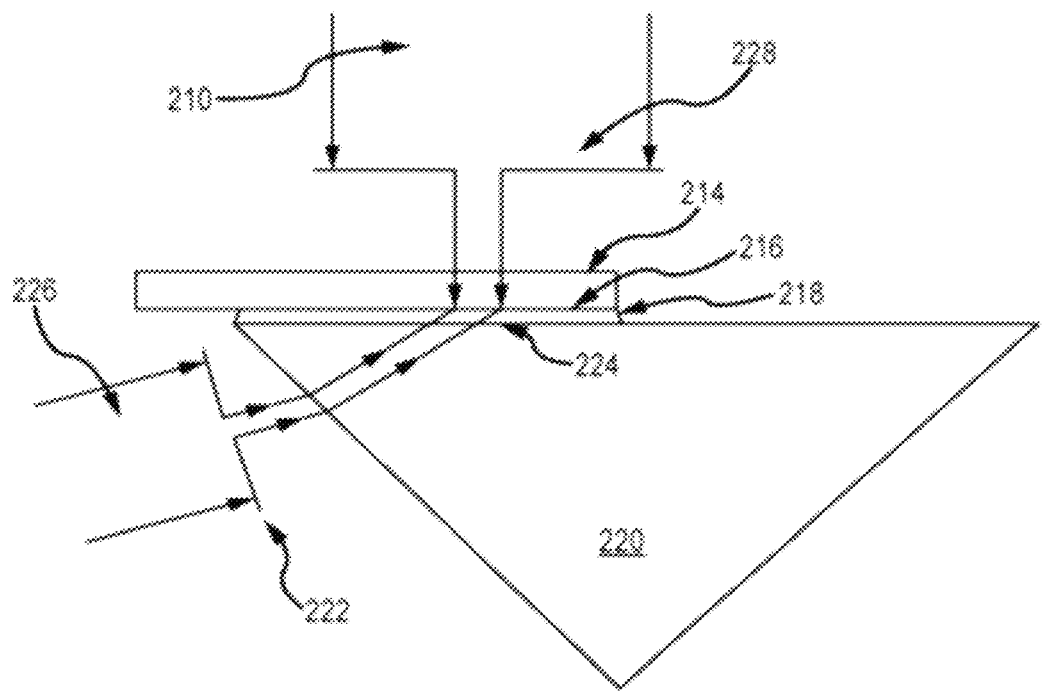
FIGS. 9a and 9b are diagrams of embodiments of recording setups and fixtures for recording the incoupling and outcoupling VHOEs, respectively.
Figure 9B:
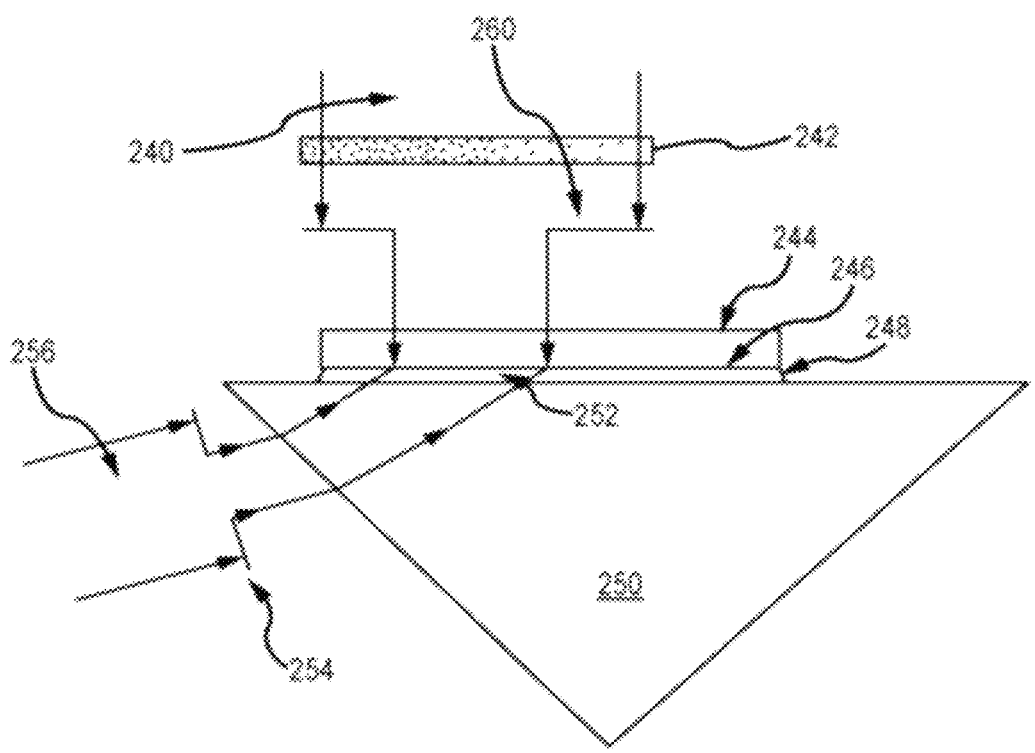
Figure 10:
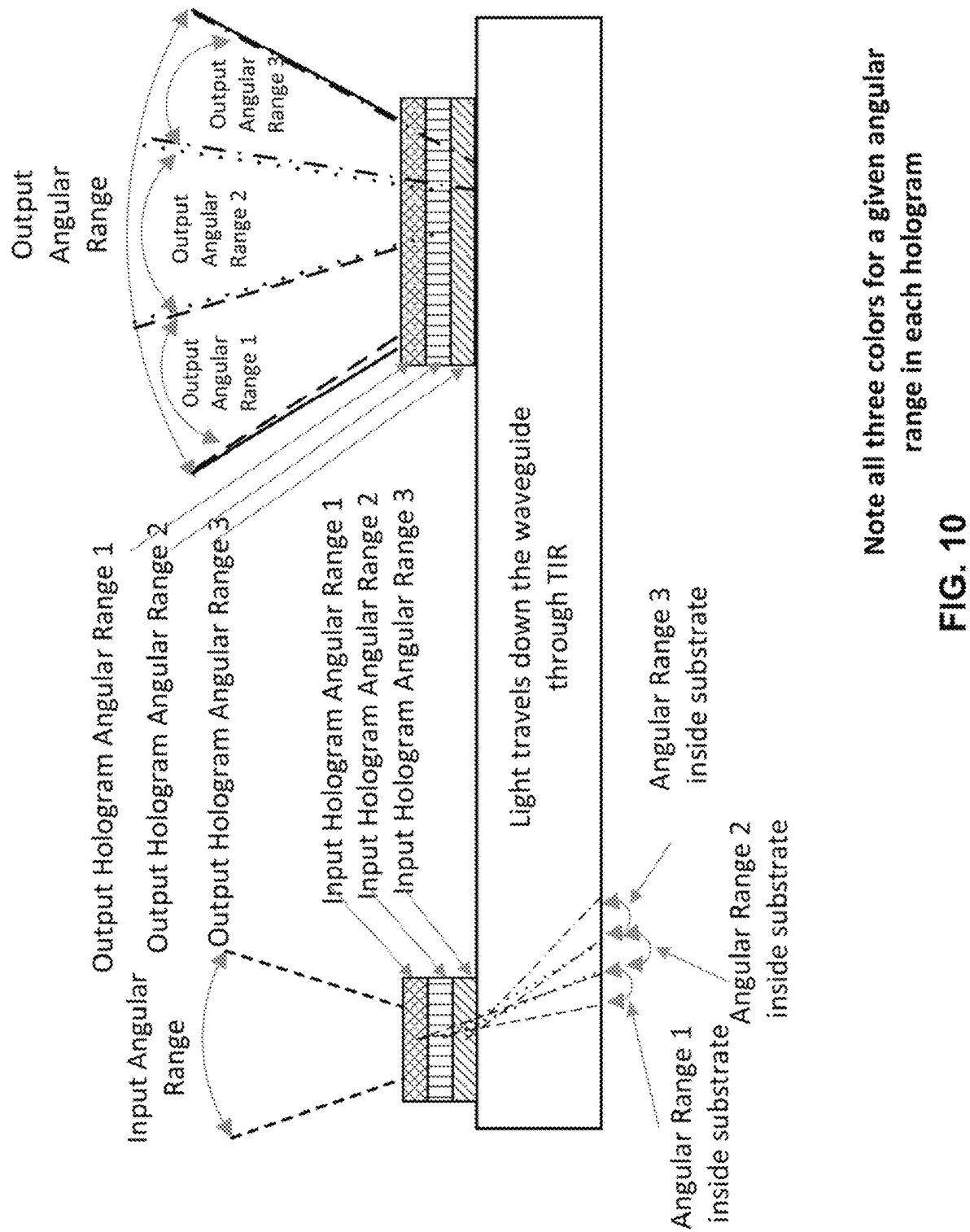
FIG. 10 shows an illustration of a waveguide image combiner with multiple stacked VHOEs, corresponding to multiple angular ranges, on a single substrate. Note that all three colors for a given angular range are in each hologram.
Figure 11:
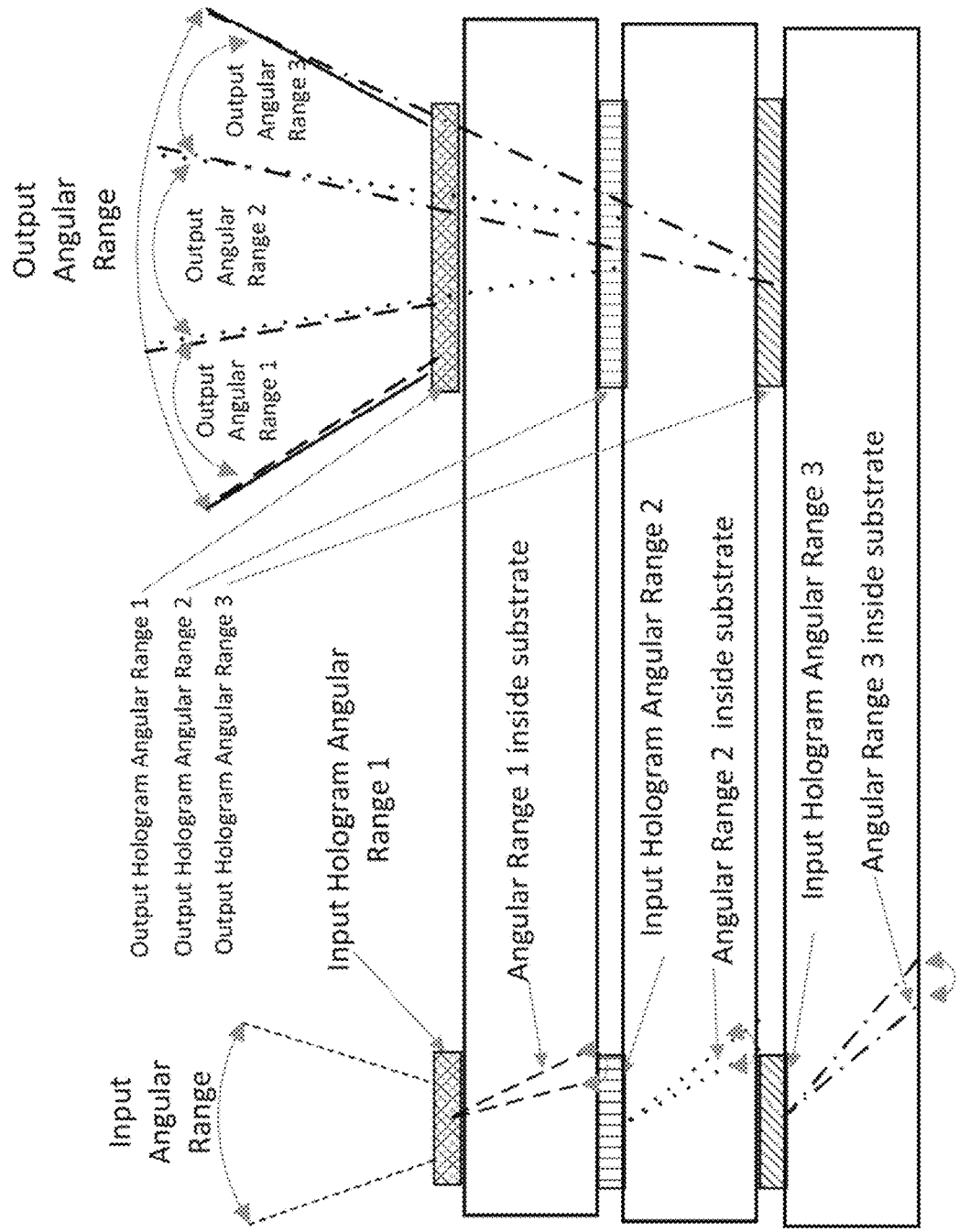
FIG. 11 shows an illustration of a multi-substrate waveguide image combiner with multiple VHOEs, corresponding to multiple angular ranges, each on a separate substrate. Note that all three colors for a given angular range are in each hologram.
Figure 12:
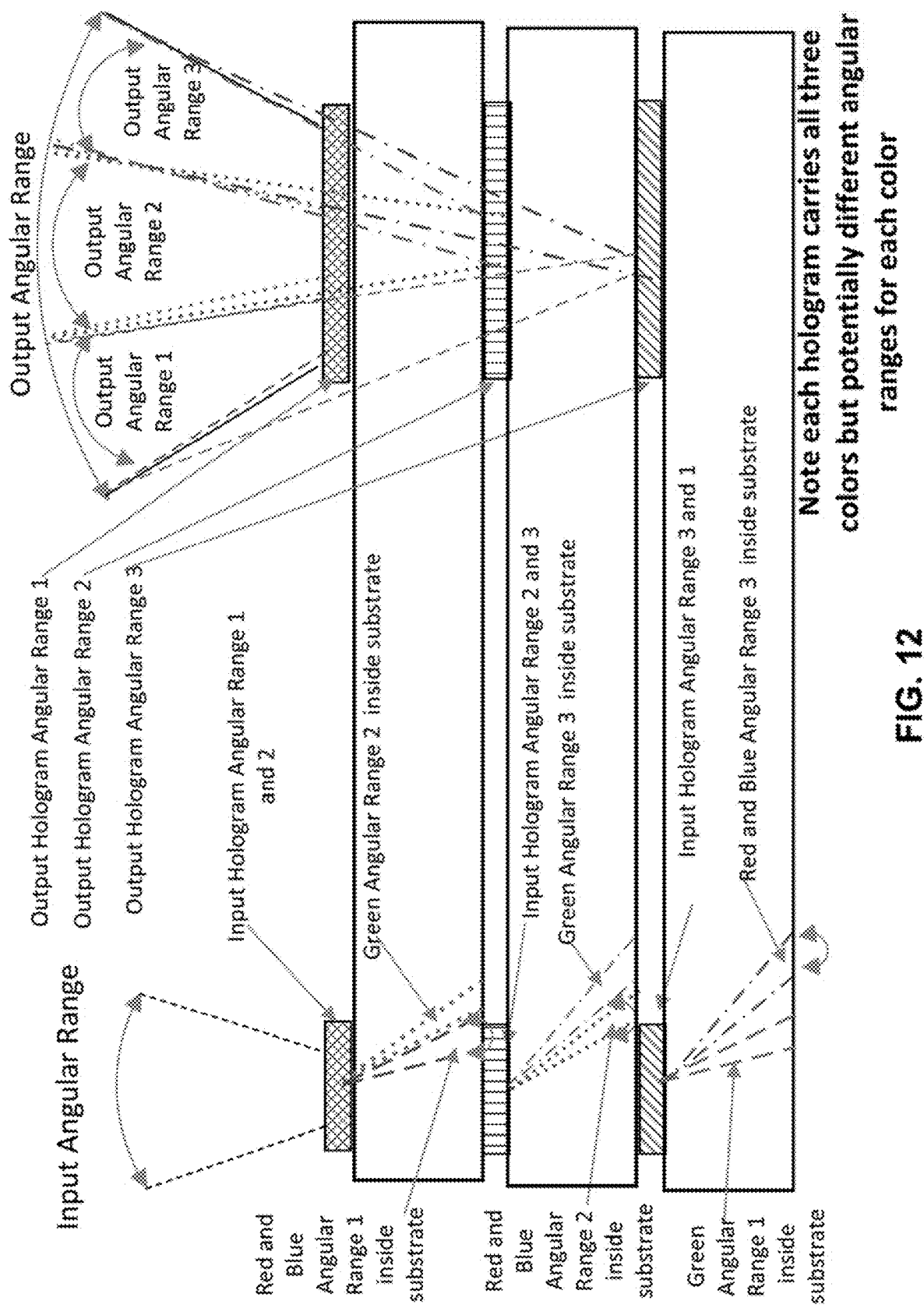
FIG. 12 shows an illustration of a multi-substrate waveguide image combiner where each hologram carries all three colors, but may have different angular ranges for each or neighboring colors.
Figure 13:
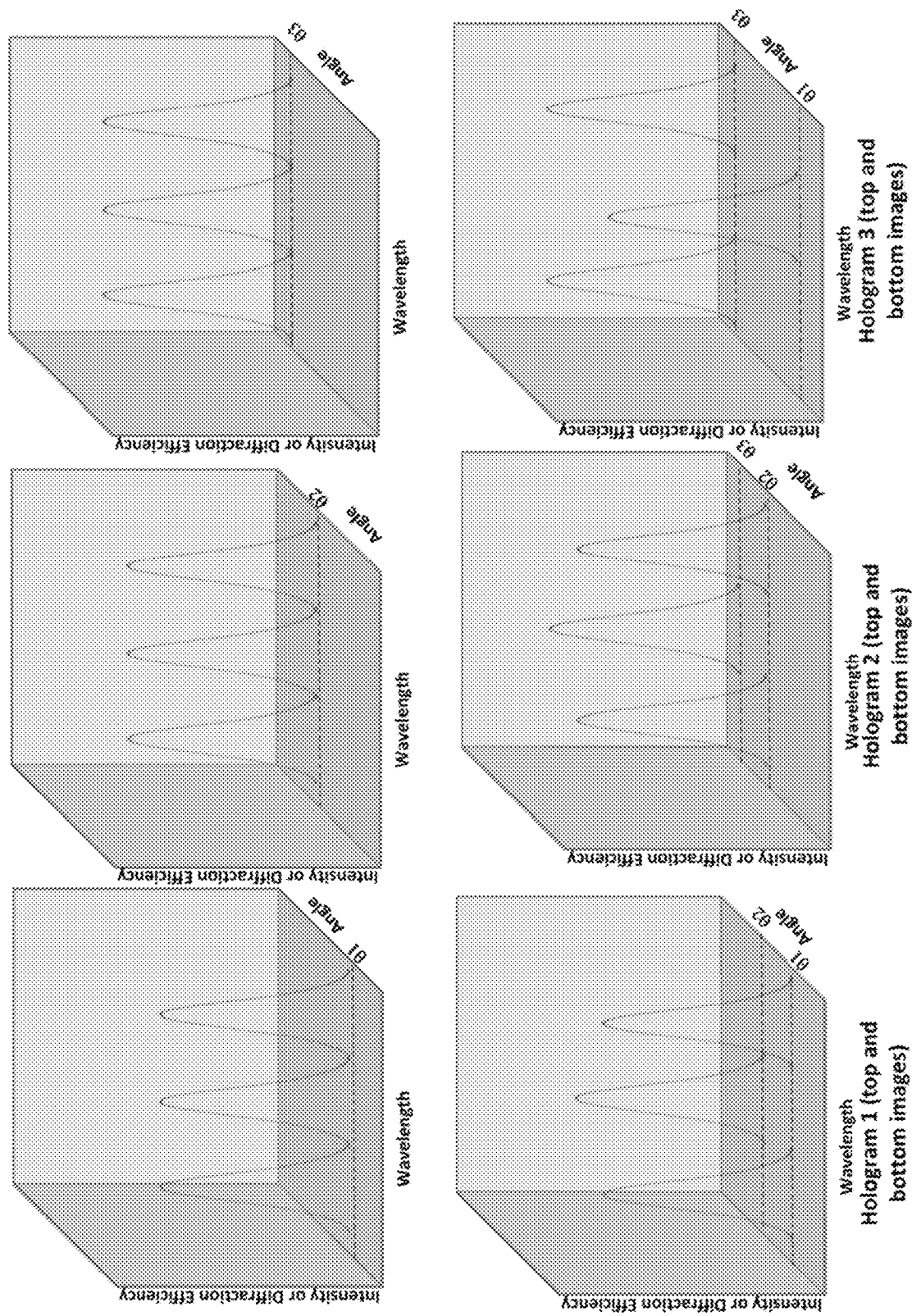
FIG. 13 shows an illustration of two of the methods to separate neighboring colors in a VHOE across different angular ranges so as to reduce overlap between the colors.
Figure 14:
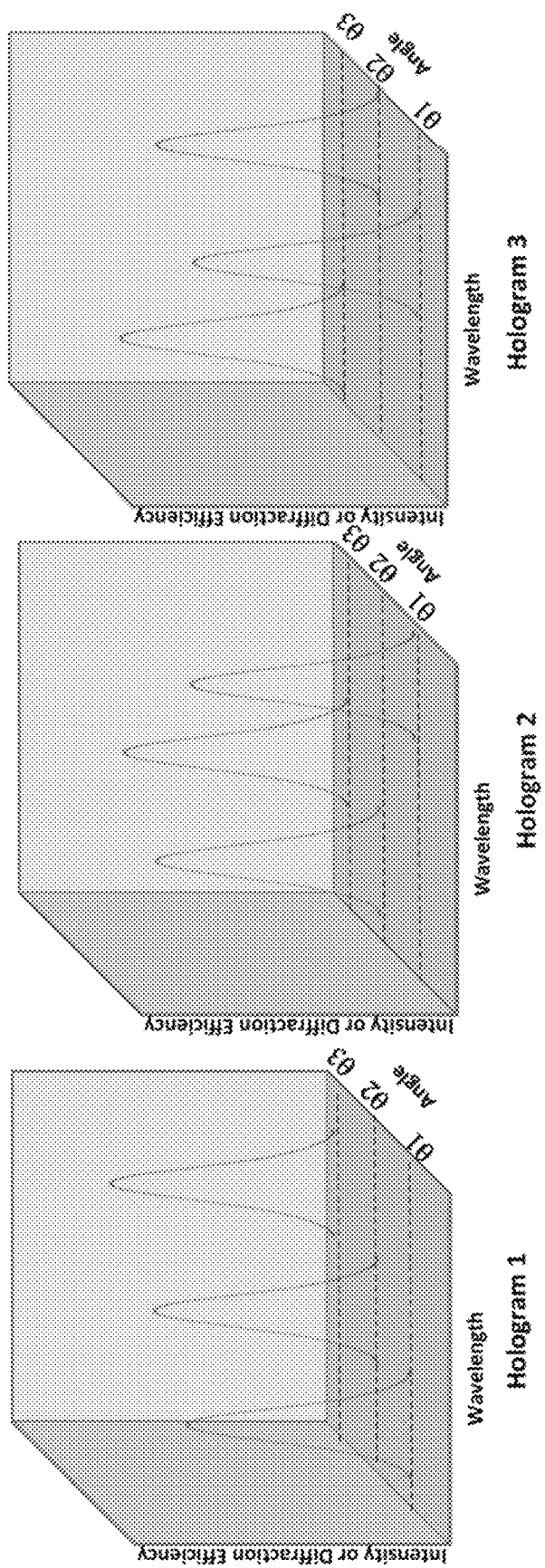
FIG. 14 shows an illustration of an embodiment were each angular range in a VHOE corresponds to a different color range.

As stated above, in-coupling and out-coupling images from reflection VHOEs that are recorded with the same geometry 210, 226, 224, 240, 256, 262, will keep the same input and output angles for each ray of the image and allow for the elimination of chromatic aberrations in the image. Both incoupling and outcoupling VHOEs include three plain (without optical power) RGB holograms overlapped in one film and also recorded with the same geometry. To achieve maximum DE for all three RGB VHOEs, they're recorded simultaneously using three RGB lasers. As was also mentioned above, each pair of in-coupling/out-coupling elements covers approximately 14° horizontal FOV. In order to provide wide horizontal FOV, more layers could be combined in such a way that each layer covers adjacent angular ranges. Alternatively, more layers with a smaller field of view could be combined. The recording laser wavelengths were single frequency 457 nm, 532 nm, and 635 nm and the recording material was 10μ Covestro photo-polymer film 216, 246 sensitive to the whole visible range. The photopolymer was laminated on a 0.7 mm soda-lime glass substrate 214, 244 with 1λ flatness and parallelism better than 10 arcminutes. The typical recording process of the VHOEs covering one angular range consisted of the following steps:

1. Substrate Preparation
   Cutting
   Cleaning
2. Photopolymer Lamination
3. Exposure Recording setup is schematically shown in the FIG. 9. In-coupling and out-coupling VHOEs are being recorded sequentially as it is shown in the figure as a) and b) respectively. After exposing the area set for the in-coupling VHOE 224 using recording beams 210 and 226 illuminated through masks 222 and 228 (FIG. 9a) the sample is parallel shifted for further exposure of the area set for the out-coupling VHOE 262 using recording beams 240 and 266 illuminated through masks 264 and 260 (FIG. 9b). In order to in-couple free-space recording beam into the substrate mode, we used a coupling prism 220, 260, which had optical contact with the sample through matching liquid 218, 248 (see FIG. 9a). In order to make gradient distribution of the DE on the out-coupling VHOE required for homogenization of the image brightness we used gradient neutral density filter 242 in the path of one of the recording beam (see FIG. 9b).

4. Photopolymer Bleaching

To fix the recorded holograms and make the whole photopolymer film transparent (bleaching process) the sample should be exposed by a beam with continuous spectrum in the range between near UV (~375 nm) and red (650 nm). We apply ~30 J/cm² radiation dose using the output of Xenon lamp.

5. Photopolymer Protection

To protect the film from environmental damage, 100 μm, cover glass was laminated on the polymer using optical quality double-sticky acrylic adhesive. The cover glass allows also eliminate distortion of the image bouncing between the outer surfaces of the sample because the glass has much higher surface flatness then the photo-polymer film.

This process describes the first stage of fabrication of the combiner, which provides horizontal FOV for one angular range (~14°). To add more angular ranges, we laminate another photo-polymer film on the top of the cover glass and repeat steps 3 through 5 for the desired angular range centered on the new input angle.

To expand the FOV of the combiner vertically (Y-expander), the following three techniques were used (see also description above):

1. Duplication of the Image Engine Pupil in the Vertical Direction Using VHOEs

This Y expanding element was recorded on DCG layer deposited on 3 mm thick substrate using three overlapped RGB VHOEs. Using volumetric RGB holograms allowed us to treat each color separately and thus eliminate color distortion in the duplicated images. DCG was used due to its high Δn, which provides wide acceptance angle than lower Δn material. The larger acceptance angle allows a larger vertical FOV. The proper values of the diffraction efficiencies providing equal brightness for all duplicated images (see FIG. 6) was achieved using, as above, a gradient mask.

2. Duplication of the Image Engine Pupil in the Vertical Direction Using Mirrors The elements for this type of Y expander shown in FIG. 7, was custom ordered from Edmund Optics.

3. Pupil Expansion in Vertical Direction Using HOE Recorded in Additional Layer Deposited on the WG Substrate The Y expanders made in the first two techniques don't have optical contact with the WG substrate and consequently these elements can be fabricated separately and then attached to the in-coupling area of the WG. The Y-expander proposed in the third technique represents a HOE recorded on an additional layer deposited on the WG substrate and consequently both X and Y expanding elements should be made in one fabrication process. This Y expanding HOE can be done using either VHOE recorded on photopolymer or surface relief grating. Depending on the type of hologram, we have to add the following steps to the process described above:

VHOE on Photopolymer

1. Photopolymer Lamination
2. Exposure

Three RGB transmission VHOEs with the same geometry with the orientation of the diffraction fringes parallel to the X direction were recorded. The period of the grating defines the cone of Y expansion 190 (see FIG. 8), which we choose to be 45.

3. Photopolymer Bleaching
   The same as above
4. Photopolymer Protection
   The same as above HOE on Surface Relief Grating 1. Photoresist Deposition on One of the WG Surface
   1818 Shipley photoresist
2. Exposure
   442 nm output of He-Cd laser
3. Developing
   351 Microposit Developer
4. Deposition of low refractive index layer
   n=1.32
5. Photoresist Protection
   Same as above using double sticky film and 100 μm 306 cover glass Multiple Stacked Substrates The present invention features embodiments in which multiple substrates are stacked to form waveguide image combiners with expanded fields of view. Each substrate separately transmits incoupled light via total internal reflectance and outcouples the transmitted light to a viewer. Each of the stacked substrates may correspond to a different angular range, or each of the stacked substrates may correspond to multiple angular ranges. For example, three stacked substrates may each transmit light in three different angular ranges and in three different color ranges, such that the waveguide image combiner as a whole transmits each color in each of the angular ranges.

In some embodiments, a color multiplexing strategy may be used so as to minimize the visual artifacts which can result from transmitting neighboring color ranges in the same substrate. It is believed that although the bandwidth of each color source is narrow, the wavelength distribution from each color source may include broad spectrum "tails" which can be inadvertently coupled through the substrate to cause undesirable visual effects. In some embodiments, the color ranges and angular ranges transmitted by each substrate are staggered such that no substrate transmits neighboring color ranges in the same angular range. Without wishing to limit the present invention to any particular theory or mechanism, it is believed that this color multiplexing strategy provides for a full color image with a wide field of view, while minimizing undesirable visual artifacts.

In one embodiment, the present invention may feature a waveguide image combiner having multiple stacked substrates for combining light from real imagery with light from a light engine. As a non-limiting example, the waveguide image combiner may comprise a first optically transparent substrate having top and bottom surfaces; a first pair of incoupling and outcoupling volume holographic optical elements (VHOEs) spaced apart and overlaid on the top surface of the first optically transparent substrate; a second optically transparent substrate having top and bottom surfaces, disposed adjacent to or stacked with the first optically transparent substrate such that the top and bottom surfaces of the two substrates are substantially parallel; a second pair of incoupling and outcoupling VHOEs spaced apart and overlaid on the top surface of the second optically transparent substrate.

In some embodiments, the optically transparent substrates may be directly stacked with each other such that only the couplers and a thin gap (such as an air gap) separate the optically transparent substrates. In other embodiments, the optically transparent substrates may be stacked with each other in such a way that there are additional layers in between them. As a non-limiting example, two optically transparent substrates may be stacked with each other such that additional optically transparent substrates or films are also stacked between them.

In some embodiments, the first pair of incoupling and outcoupling VHOEs corresponds to a first angular range and the second pair of incoupling and outcoupling VHOEs corresponds to a second angular range. In one embodiment, the second angular range may be adjacent to the first angular range. In some embodiments, the angular ranges may be non-overlapping but contiguous. In other embodiments, the angular ranges may be slightly overlapping or have slight gaps between them. In preferred embodiments, the limits of the adjacent angular ranges are such that a viewer cannot visually detect any transition between the angular ranges.

In some embodiments, each optically transparent substrate is configured to convey light from the overlaid incoupling VHOE to the overlaid outcoupling VHOE via total internal reflection (TIR). The boundaries of this TIR may be the edges of the substrate itself, or may include additional layers on the substrate, such as VHOEs, diffraction gratings, or other layers with similar refractive index to the substrate. In some embodiments, the multiple substrates are separated from each other by a transparent layer of matter with a different diffractive index from the substrate. As a non-limiting example, the multiple substrates may have an air layer between the substrates. In one embodiment, the stacked substrates may have spacers such as glass or polymer beads between the substrates to maintain the air layer. Other gasses, sol gels, liquids, or solids may also form the layers between the substrates. The thickness of the air gap between the substrates should be greater than the source wavelength (400 nm-700 nm) and can be set with a spacing element or by the natural height variation of the substrate material.

According to one embodiment, the first and second angular ranges are horizontal angular ranges and the incoupling VHOEs are spaced apart horizontally on the surface of the substrate from the outcoupling VHOEs. The incoupling VHOEs may be stacked on top of each other, either directly or with layers in between, in the direction perpendicular to both the horizontal and vertical axis of the substrate (Z-direction). Similarly, the outcoupling VHOEs may be stacked on top of each other, either directly or with layers in between, in the direction perpendicular to both the horizontal and vertical axis of the substrate (Z-direction). In some embodiments, the light from the light engine may be at an angle relative to the normal of the substrate (wrap angle) and the incoupling gratings may be slightly shifted (or offset) to account for the geometric change in the position of the light.

According to another embodiment, the first and second angular ranges are vertical angular ranges and the incoupling and outcoupling VHOEs are spaced apart vertically. In preferred embodiments, the first and second angular ranges are ranges along a common plane. According to some embodiments, the first and second incoupling VHOEs are aligned and the first and second outcoupling VHOEs are aligned. As a non-limiting example, the incoupling VHOEs may be substantially overlapping and the outcoupling VHOEs may be substantially overlapping.

In some embodiments, the waveguide image combiner may have more than two layered substrates. As non-limiting examples, the waveguide image combiner may have 3, 4, 5, 6, 7, 8, 9, 10 or more than 10 stacked substrates. In one embodiment, the waveguide image combiner may additionally comprise a third optically transparent substrate having top and bottom surfaces, disposed adjacent to or stacked with the second optically transparent substrate such that the top and bottom surfaces of the two substrates are substantially parallel; and a third pair of incoupling and outcoupling VHOEs spaced apart and overlaid on the top surface of the third optically transparent substrate, wherein the third pair of incoupling and outcoupling VHOEs corresponds to a third angular range, which is adjacent to the second angular range. Similarly, each additional substrate may comprise an additional pair of incoupling and outcoupling VHOEs. There may be as many angular ranges as substrates. For example, a waveguide image combiner with five substrates may have five angular ranges. The angular ranges may have minimal overlap, or may have substantial overlap. In some embodiments the angular ranges may overlap by up to or more than 50%.

In some embodiments, each substrate may additionally comprise an image expander configured to expand a second angular range which is different from the first angular range, or even perpendicular to the first angular range. As a non-limiting example, if the first angular range is along the x-axis, the image expander may comprise a y-expander. Similarly, if the first angular range is along the y-axis, the image expander may comprise a x-expander. In some embodiments, the image expander may be disposed on the top or bottom surface of each optically transparent substrate between the incoupling and outcoupling VHOEs. In some embodiments, the image expander may partially overlap with the incoupling or outcoupling VHOE. In some embodiments, each VHOE may comprise a plurality of gratings corresponding to a plurality of color ranges. These gratings may be in the same layer or in different layers. In one embodiment, the light from the light engine may have a bandwidth of between about 10 nm and 40 nm per color. In other embodiment, the light from the light engine may have a bandwidth of between about 5 nm and 60 nm per color.

In one embodiment, the present invention features a waveguide image combiner which uses a color multiplexing strategy. As a non-limiting example, the waveguide image combiner may comprise: a first optically transparent substrate having top and bottom surfaces; a first pair of couplers, the pair comprising an incoupler and an outcoupler, spaced apart and overlaid on the top surface of the first optically transparent substrate; a second optically transparent substrate having top and bottom surfaces, disposed adjacent to or stacked with the first optically transparent substrate such that the top and bottom surfaces of the two substrates are substantially parallel; and a second pair of incoupling and outcoupling couplers spaced apart and overlaid on the top surface of the second optically transparent substrate; where each coupler comprises one or more volume holographic optical elements (VHOEs), each VHOE comprises one or a plurality of gratings, each of the gratings corresponds to a color range and an angular range, and where each VHOE comprises gratings corresponding to different angular ranges. As used herein, the term "coupler" refers to an incoupler or an outcoupler comprising one or more VHOEs. The VHOEs in a coupler may be stacked on top of each other and may each comprise one or more gratings. Each grating may correspond to one or more color ranges. As a non-limiting example, a single grating may correspond to both red and blue color ranges or to red, green, and blue color ranges. Alternatively, each coupler may comprise a separate single-grating VHOE for each color range.

In some embodiments, each optically transparent substrate may be configured to convey light from the overlaid incoupler to the overlaid outcoupler via total internal reflection (TIR). On other embodiments, the waveguide image combiner is configured for a set number of color ranges and each coupler comprises one grating corresponding to each of the color ranges. In a selected embodiment, no two gratings within a coupler which have the same angular range correspond to neighboring color ranges in the electromagnetic spectrum. As a non-limiting example, in the three color range, red, green, and blue system, red and green may be considered to be neighboring color ranges and green and blue may be considered to be neighboring color ranges. Color ranges may be considered to be neighboring color ranges unless another color range selected for use is between them in the electromagnetic spectrum. For example, if a combiner was configured to only use red and blue color ranges, they would be considered to be neighboring color ranges, because the green color range between them is not used by the combiner. Similarly, red and green are considered to be neighboring color ranges, even though there are color ranges between them, as long as those color ranges are not used. In one embodiment, each coupler comprises a red grating corresponding to a red color range, a green grating corresponding to a green color range and a blue grating corresponding to a blue color range, and each green grating corresponds to a different angular range than both the red grating and the blue grating of the same coupler. In another embodiment, each coupler comprises a different angular range for each color. In some embodiments, the light from the light engine has a bandwidth of between about 10 nm and 40 nm, or between about 5 nm and 60 nm, per color. In some embodiments, the waveguide image combiner may comprise three or more stacked optically transparent substrates, each optically transparent substrate comprising a pair of incoupling and outcoupling couplers spaced apart and overlaid on a top surface of the optically transparent substrate. In some embodiments, the waveguide image combiner may correspond to three or more angular ranges. As a non-limiting example, the waveguide image combiner may correspond to as many angular ranges as there are substrates.

In one embodiment, the present invention features a method of producing a waveguide image combiner. As a non-limiting example, the method may comprise: defining a total angular output range along a first axis (for example, a horizontal axis), which is segmented into a plurality of adjacent angular output ranges; providing a plurality of optically transparent substrates having top and bottom surfaces, the substrates aligned and disposed adjacent to or stacked with each other such that the top and bottom surfaces of the substrates are substantially parallel, wherein each substrate comprises a pair of couplers, comprising an overlaid incoupler and an overlaid outcoupler spaced apart on the top surface of the substrate, wherein each coupler comprises one or more volume holographic optical elements (VHOEs), each VHOE comprises one or more gratings, each grating corresponding to a color range; recording a holographic pattern which corresponds to an angular output range on each grating such that no two gratings within a coupler which have the same angular range correspond to neighboring color ranges in the electromagnetic spectrum.

In some embodiments, each optically transparent substrate may additionally comprise an image expander configured to expand an angular output range along a second axis (for example, a vertical axis) which is perpendicular to the first axis. As a non-limiting example, each coupler may comprise a red grating corresponding to a red color range, a green grating corresponding to a green color range and a blue grating corresponding to a blue color range, and each green grating may correspond to a different angular range than both the red grating and the blue grating of the same coupler. In another embodiment, the grating corresponding to each color within any coupler comprises a different angular range.

Example Process for Producing an Image Waveguide Combiner

The following is a non-limiting example of the present invention. It is to be understood that said example is not intended to limit the present invention in any way. Equivalents or substitutes are within the scope of the present invention.

Step 1: Remove the protective film on a photopolymer. Laminate the photopolymer film on the top surface of a thick and transparent optical parallel plate. A laser beam is to be coupled in from the bottom of the plate.

Step 2: Apply a thin layer of emersion liquid on top of the laminated photopolymer. Place an optical prism on the photopolymer. The hypotenuse face is adjacent to the photopolymer. Another laser beam is to be coupled in from a side face of the prism.

Step 3: Turn on the red laser for the exposure time period. The two laser beams propagate through the thick optical plate and the optical prism respectively and interfere with each other. The interference pattern is thus recorded in the photopolymer between the plate and the prism. The recorded pattern is masked into two regions with optically opaque material placed on the light paths. A pair of VHOEs has been created in the photopolymer in the two regions. The smaller VHOE approximately 3 mm by 5 mm is the incoupler, and the bigger VHOE approximately 25 mm by 30 mm is the outcoupler. The incoupler is vertically at the half height of the outcoupler and horizontally apart from the outcoupler by 15 mm. The incident angles of the two beams on the photopolymer is set in such a way that the red VHOE pair corresponds to an angular range from −21° to −7°.

Step 4: Remove the prism after recording. Clean the emersion fluid off the photopolymer. Delaminate the photopolymer from the thick plate. Place a new protective layer on the photopolymer.

Step 5: Repeat the recording process Steps 1 to 4 in the two adjacent areas on the photopolymer film roll using green and blue lasers respectively. The red, green and blue VHOE pairs each correspond to an angular range from −21° to −70°.

Step 6: Set up another exposure station with adjusted incident angles of the two recoding beams and repeat the Steps 1 to 5. The resultant red, green and blue VHOE pairs correspond to another angular range from −7° to +7°. Set up a third exposure station with re-adjusted incident angle so as to record another three VHOE pairs corresponding to the last angular range from +7° to +21° in 3 colors.

Step 7: Provide a first transparent glass substrate having the following dimensions of 40 mm by 60 mm. Clean the substrate thoroughly to remove any dusts and residue.

Step 8: Cut each VHOE pair off the photopolymer roll. Remove the protective film. Laminate the green VHOE pair corresponding to −21° to −7° to a position where the incoupler is 10 mm from a shorter edge on the first substrate. Cut off the excessive film around the substrate.

Step 9: Repeat Steps 7 and 8 on the red VHOE pair corresponding to the same angular range.

Step 10: Repeat Step 8 on the blue VHOE pair corresponding to the same angular range using the result of Step 9 as the substrate. Laminate the blue VHOE pair on the red VHOE pair at the same position.

Step 11: Repeat Steps 7 to 10 on the 3 color VHOE pairs corresponding to two other angular ranges.

Step 12: Cure the 6 laminated VHOE plates in broad band UV light for 5 minutes.

Step 13 (Note is the first step in the production of the Surface Relief Grating): Provide a second transparent glass substrate having the following dimensions of 40 mm by 60 mm. Clean the substrate thoroughly to remove any dusts and residue.

Step 14: Coat a thin layer of photoresist film on the substrate surface. Pre-bake the photoresist. Laminate a UV-absorbing film on the back side of the substrate. Set it in the two collimated UV laser beams to record their interference pattern. The incident angles of the two beams are configured properly according to any waveguide design. The pattern is masked in a region of 15 mm by 30 mm. The region is vertically centered and horizontally 13 mm away from a short edge of the substrate.

Step 15: The rest of the SRG-making process can follow any standard SU8 development procedure. Develop the photoresist after the exposure to remove the unexposed portions. Post bake and hard bake the developed photoresist. The RG (surface relief grating) is now finished in the 15 mm by 30 mm region.

Step 16: Coat a 1-μm thick optically clear adhesive layer on the green VHOE on the first glass substrate and the back side of the SRG substrate respectively. Laminate the green VHOE and the SRG glass substrate together. The VHOE film adheres to the bottom of the SRG glass plate while the SRG faces up. Place the SRG region in between the incoupling and the outcoupling VHOE pair. The two glass substrates are in parallel. Repeat the process for all the green VHOE plates and the red-blue VHOE plates. They are the waveguides corresponding to each angular range and each color.

Step 17 (Note: Optional): Apply tiny beads of 10 μm in diameter to the top of the red-blue waveguide corresponding to the angular range of −21° to −7°. Constrain the beads in the marginal areas close to the 4 waveguide edge and outside the grating areas. Place the green waveguide corresponding to the angular range of +7° to +21° on top of the red-blue waveguide. The spacers keep an air gap between the two waveguides.

Step 18: Repeat Step 17 on the rest of the waveguides following the color multiplexing arrangement listed in Table 1. Now the 3 RGB-color combined waveguides are produced corresponding to the 3 angular ranges. The angular ranges and the color ranges are multiplexed among them.

Step 19: Apply the spacers similarly as above to stack the 3 combined waveguides and to keep the air gaps in between. Apply a small amount of glue around the edges of the waveguide stack. This is a finished waveguide combiner.

Example Angular Ranges

The following tables set forth non-limiting examples of the angular ranges which may correspond to each grating within each substrate. In some embodiments, each numbered substrate may in fact comprise a substrate pair (example: "Substrate Pair 1, Substrate Pair 2, Substrate Pair 3," instead of "Substrate 1, Substrate 2, Substrate 3") It is to be understood that said examples are not intended to limit the present invention in any way. Equivalents or substitutes are within the scope of the present invention.

TABLE 1

Example angular ranges for a three substrate embodiment

|  | Red Grating | Green Grating | Blue Grating |
| --- | --- | --- | --- |
| Substrate 1 | −21° to −7° | +7° to +21° | −21° to −7° |
| Substrate 2 | −7° to +7° | −21° to −7° | −7° to +7° |
| Substrate 3 | +7° to +21° | −7° to +7° | +7° to +21° |

TABLE 2

Example angular ranges for a three substrate embodiment

|  | Red Grating | Green Grating | Blue Grating |
| --- | --- | --- | --- |
| Substrate 1 | −21° to −7° | +7° to +21° | −7° to +7° |
| Substrate 2 | −7° to +7° | −21° to −7° | +7° to +21° |
| Substrate 3 | +7° to +21° | −7° to +7° | −21° to −7° |

TABLE 3

Example angular ranges for a four substrate embodiment

|  | Red Grating | Green Grating | Blue Grating |
| --- | --- | --- | --- |
| Substrate 1 | −28° to −14° | +14° to +28° | 0° to +14° |
| Substrate 2 | −14° to 0° | −28° to −14° | +14° to +28° |
| Substrate 3 | 0° to +14° | −14° to 0° | −28° to −14° |
| Substrate 4 | +14° to +28° | 0° to +14° | −14° to 0° |

TABLE 4

Example angular ranges for a five substrate embodiment

|  | Red Grating | Green Grating | Blue Grating |
|---|---|---|---|
| Substrate 1 | −25° to −15° | +15° to +25° | −25° to −15° |
| Substrate 2 | −15° to −5° | −25° to −15° | −15° to −5° |
| Substrate 3 | −5° to +5° | −15° to −5° | −5° to +5° |
| Substrate 4 | +5° to +15° | −5° to +5° | +5° to +15° |
| Substrate 5 | +15° to +25° | +5° to +15° | +15° to +25° |

TABLE 5

Example angular ranges for a five substrate embodiment with overlapping angular ranges.

|  | Red Grating | Green Grating | Blue Grating |
|---|---|---|---|
| Substrate 1 | −28° to −7° | +7° to +28° | 0° to +14° |
| Substrate 2 | −14° to 0° | −28° to −7° | +7° to +28° |
| Substrate 3 | −7° to +7° | −14° to 0° | −28° to −7° |
| Substrate 4 | 0° to +14° | −7° to +7° | −14° to 0° |
| Substrate 5 | +7° to +28° | 0° to +14° | −7° to +7° |

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

As used herein, the term "about" refers to plus or minus 10% of the referenced number.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A waveguide image combiner for combining light from real imagery with light from a light engine, said waveguide image combiner comprising:
   a. a first optically transparent substrate having top and bottom surfaces;
   b. a first pair of incoupling and outcoupling volume holographic optical elements (VHOEs) spaced apart and overlaid on the top surface of the first optically transparent substrate;
   c. a second optically transparent substrate having top and bottom surfaces, stacked with the first optically transparent substrate such that the top and bottom surfaces of the two substrates are substantially parallel; and
   d. a second pair of incoupling and outcoupling VHOEs spaced apart and overlaid on the top surface of the second optically transparent substrate;
   wherein a first outcoupling VHOE of the first pair of incoupling and outcoupling VHOEs is configured for a first light transmission according to a first output angular range and a second output angular range, and
   wherein a second outcoupling VHOE of the second pair of incoupling and outcoupling VHOEs is configured for a second light transmission according to the second output angular range.

2. The waveguide image combiner of claim 1, wherein each optically transparent substrate is configured to convey light from the overlaid incoupling VHOE to the overlaid outcoupling VHOE via total internal reflection (TIR).

3. The waveguide image combiner of claim 1, wherein the second angular range is adjacent to the first angular range.

4. The waveguide image combiner of claim 1, wherein the first and second angular ranges are horizontal angular ranges.

5. The waveguide image combiner of claim 1, wherein the first and second incoupling VHOEs are aligned and the first and second outcoupling VHOEs are aligned.

6. The waveguide image combiner of claim 1, additionally comprising:
   a. a third optically transparent substrate having top and bottom surfaces, stacked with the second optically transparent substrate such that the top and bottom surfaces of the two substrates are substantially parallel; and
   b. a third pair of incoupling and outcoupling VHOEs spaced apart and overlaid on the top surface of the third optically transparent substrate; wherein the third pair of incoupling and outcoupling VHOEs corresponds to a third angular range, which is adjacent to the second angular range.

7. The waveguide image combiner of claim 1, additionally comprising an image expander configured to expand an angular output range which is perpendicular to the first angular range, the image expander disposed on the top or bottom surface of each optically transparent substrate between the incoupling and outcoupling VHOEs.

8. The waveguide image combiner of claim 1 wherein each VHOE comprises a plurality of gratings corresponding to a plurality of color ranges.

9. The waveguide image combiner of claim 1, wherein the light from the light engine has a bandwidth of between 10 nm and 40 nm per color.

10. A waveguide image combiner for combining light from real imagery with light from a light engine, said waveguide image combiner comprising:
   a. a first optically transparent substrate having top and bottom surfaces;
   b. a first pair of couplers comprising a first incoupler and a first outcoupler that are spaced apart and overlaid on the top surface of the first optically transparent substrate;
   c. a second optically transparent substrate having top and bottom surfaces, stacked with the first optically transparent substrate such that the top and bottom surfaces of the two substrates are substantially parallel; and d. a second pair of couplers comprising a second incoupler and a second outcoupler that are spaced apart and overlaid on the top surface of the second optically transparent substrate;

wherein each coupler comprises one or more volume holographic optical elements (VHOEs), wherein each VHOE comprises one or more gratings, wherein each of the gratings corresponds to a color range and an angular range, wherein each coupler comprises gratings corresponding to different angular ranges, wherein the first outcoupler is configured for a first light transmission according to a first output angular range and a second output angular range, and wherein the second outcoupler is configured for a second light transmission according to the second output angular range.

11. The waveguide image combiner of claim 10, wherein each optically transparent substrate is configured to convey light from the overlaid incoupler to the overlaid outcoupler via total internal reflection (TIR).

12. The waveguide image combiner of claim 10, wherein the waveguide image combiner is configured for a set number of color ranges and each coupler comprises one grating corresponding to each of the color ranges.

13. The waveguide image combiner of claim 10, wherein no two gratings within a coupler which have the same angular range, correspond to neighboring color ranges in the electromagnetic spectrum.

14. The waveguide image combiner of claim 10, wherein the waveguide image combiner comprises three or more stacked optically transparent substrates, each optically transparent substrate comprising a pair of incoupling and outcoupling couplers spaced apart and overlaid on a top surface of the optically transparent substrate, and wherein the waveguide image combiner corresponds to three or more angular ranges.

15. The waveguide image combiner of claim 10, wherein the light from the light engine has a bandwidth of between 10 nm and 40 nm per color.

16. A method of producing a waveguide image combiner, the method comprising:
    a. defining a total angular output range along a first axis, which is segmented into a plurality of adjacent angular output ranges;
    b. providing a plurality of optically transparent substrates having top and bottom surfaces, the substrates aligned and stacked with each other such that the top and bottom surfaces of the substrates are substantially parallel, wherein each substrate comprises a pair of couplers, comprising an overlaid incoupler and an overlaid outcoupler, spaced apart on the top surface of the substrate, wherein each coupler comprises one or more volume holographic optical elements (VHOEs) and each of the VHOEs comprise one or more gratings, wherein each grating corresponds to a color range, wherein a first outcoupler of a first pair of couplers is configured for a first light transmission according to a first output angular range and a second output angular range, and wherein a second outcoupler of a second pair of couplers is configured for a second light transmission according to the second output angular range; and
    c. recording a holographic pattern which corresponds to an angular output range on each grating such that no two gratings within a coupler which have the same angular range correspond to neighboring color ranges in the electromagnetic spectrum.

17. The method of claim 16, wherein defining the total angular output along the first axis comprises defining the total angular output along a horizontal axis.

18. The method of claim 16, wherein each optically transparent substrate additionally comprises an image expander configured to expand an angular output range along a second axis which is perpendicular to the first axis.

19. The method of claim 18, wherein expanding the angular output range along the second axis comprises expanding the angular output range along a vertical axis.

20. The method of claim 16, wherein each coupler comprises a red grating corresponding to a red color range, a green grating corresponding to a green color range and a blue grating corresponding to a blue color range, and wherein each green grating, red grating, and blue grating corresponds to a different angular range of the same coupler.

* * * * *